(12) United States Patent
Tsai et al.

(10) Patent No.: US 11,153,181 B1
(45) Date of Patent: Oct. 19, 2021

(54) DYNAMIC NODE RECONFIGURATION AND PROVISIONING OF NETWORK DEVICES

(71) Applicant: Amazon Technologies, Inc., Seattle, WA (US)

(72) Inventors: Kun Ting Tsai, Fremont, CA (US); Haritha Tamvada, San Jose, CA (US); Kiran Kumar Edara, Cupertino, CA (US); Andrew Price, Cupertino, CA (US); Omar Fawazhashim Zakaria, Saratoga, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/703,221

(22) Filed: Dec. 4, 2019

(51) Int. Cl.
| | |
|---|---|
| *G06F 13/00* | (2006.01) |
| *H04L 12/24* | (2006.01) |
| *H04L 12/751* | (2013.01) |
| *H04L 29/06* | (2006.01) |
| *H04L 12/931* | (2013.01) |
| *H04L 12/26* | (2006.01) |
| *H04L 12/713* | (2013.01) |

(52) U.S. Cl.
CPC ...... *H04L 41/5054* (2013.01); *H04L 41/0816* (2013.01); *H04L 43/0864* (2013.01); *H04L 45/02* (2013.01); *H04L 45/586* (2013.01); *H04L 49/354* (2013.01); *H04L 63/0876* (2013.01)

(58) Field of Classification Search
CPC ............. H04L 41/5054; H04L 63/0876; H04L 41/0816; H04L 49/354; H04L 45/586; H04L 45/02; H04L 43/0864
USPC .................. 709/220–222, 250, 227, 238
See application file for complete search history.

(56) References Cited

U.S. PATENT DOCUMENTS

| | | | | |
|---|---|---|---|---|
| 7,395,322 | B2* | 7/2008 | Harvey | H04L 67/303 709/203 |
| 8,898,279 | B2* | 11/2014 | Schick | H04L 43/50 709/224 |
| 10,158,530 | B2* | 12/2018 | James | H04L 41/0806 |
| 2006/0190575 | A1* | 8/2006 | Harvey | H04L 67/125 709/222 |
| 2008/0031136 | A1* | 2/2008 | Gavette | H04L 12/66 370/235 |
| 2009/0049170 | A1* | 2/2009 | Schick | H04L 41/5009 709/224 |
| 2015/0333956 | A1* | 11/2015 | James | H04L 45/48 709/220 |
| 2019/0089592 | A1* | 3/2019 | Li | H04L 41/0886 |

* cited by examiner

*Primary Examiner* — Kenneth R Coulter
(74) *Attorney, Agent, or Firm* — Lowenstein Sandler LLP

(57) ABSTRACT

Technologies directed to determining a role of a network device, configuring the network device according to the role, and provisioning the network device to a network are described. In one method, the hardware configuration information and external connection information are stored by the network device. The network device determines a role using the hardware configuration information and the external connection information without any manual intervention or manual configuration. The role can be any one of a Router Node, a Storage Node, a Base Station Node, a Relay Node, a Gateway Node, or a Customer Premises Equipment (CPE) Node. After recognizing the role, the network device can be configured and provisioned to the network without any manual intervention or manual configuration.

20 Claims, 11 Drawing Sheets

US 11,153,181 B1

DYNAMIC NODE RECONFIGURATION AND PROVISIONING OF NETWORK DEVICES

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, Personal Digital Assistants (PDAs), portable media players, tablet computers, netbooks, laptops, and the like. These electronic devices wirelessly communicate with a communications infrastructure to enable the consumption of the digital media items. In order to communicate with other devices wirelessly, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Traditional enterprise network deployments require technicians with expert level knowledge of the product, device capabilities, and placement and configurations. This is very expensive and time consuming, as the deployment engineer must manually configure each device in a cluster with specific configuration for the devices' desired operations, referred to herein as "nodes." Aspects of the present disclosure can overcome these deficiencies by providing automation to enterprise network deployments, including automatic role recognition, dynamic node configuration, and automatic node provisioning. The described technologies can allow a network device to self-recognize their role (e.g., a Router Node, a Storage Node, a Base Station Node, a Relay Node, a Gateway Node, or a CPE Node) without any manual intervention or configuration. The described technologies can also allow the network device to self-configure the network device according to the role and self-provision to a network without any manual intervention or configuration. In one method, the hardware configuration information and external connection information are stored by the network device. The network device automatically recognizes a role using the hardware configuration information and the external connection information without any manual intervention or manual configuration. The role can be any one of a Router Node, a Storage Node, a Base Station Node, a Relay Node, a Gateway Node, or a Customer Premises Equipment (CPE) Node. In other embodiments, each of the Router Node, Base Station Node, Gateway Node, and CPE node can be a hybrid node with a Storage Node. That is, a storage device can be attached to any of the devices and the role can be recognized as a hybrid Router and Storage Node, a hybrid Base Station and Storage Node, a hybrid Gateway and Storage Node, and a hybrid CPE and Storage Node using the external connection information, After recognizing the role, the network device can be automatically configured and provisioned to the network without any manual intervention or manual configuration.

Aspects of the present disclosure can reduce the cost and time for enterprise network deployments by a network device automatically recognizing a role, automatically configuring according to the role, and automatically provisioning the network device to a network.

Aspects of the present disclosure can allow any node to be seamlessly self-repurposed to other roles to maximize reusability and reduce cost of the deployment. This technology can be used for scaling up an enterprise network deployment through touchless deployment by employees or subcontractors without the expert level knowledge of the product, device capabilities, and placement and configurations.

Figure 1:
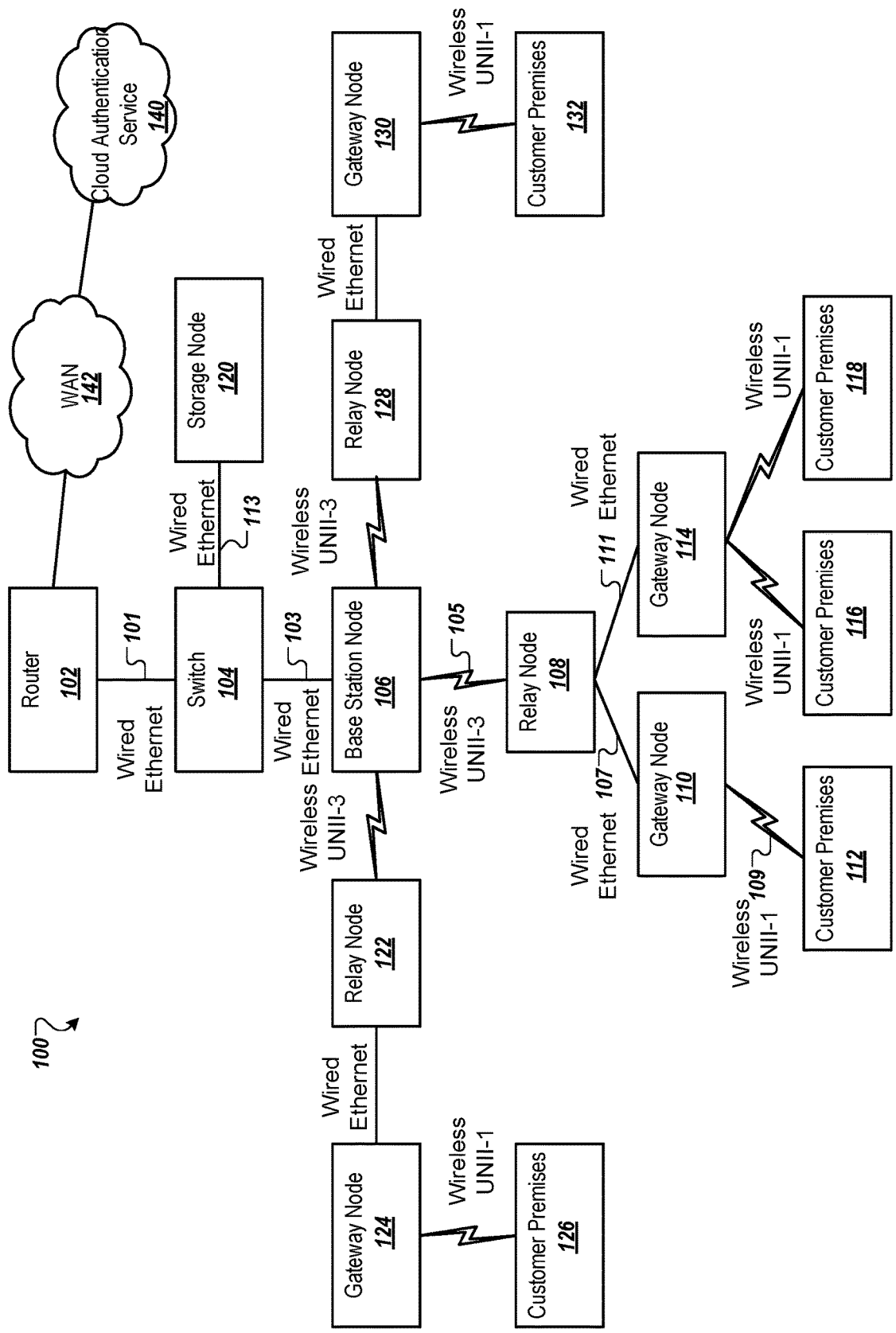
FIG. 1 is a network diagram of a network deployment in which network devices self-recognize their respective role, self-configure according to the respective role, and self-provision to a network according to one embodiment.

FIG. 1 is a network diagram of a network deployment in which network devices self-recognize their respective role, self-configure according to the respective role, and self-provision to a network 100 according to one embodiment. The network 100 is an exemplary network in which multiple different network devices are powered up at different points in time, where each of the different network devices can self-recognize its respective role, self-configure according the respective role, and self-provision to the network 100. It should be noted that the network 100 can be formed in other configurations with other numbers of network devices than as illustrated in FIG. 1.

Referring back to FIG. 1, during network deployment, a first network device 102 can be powered on at a power-up event. The first network device 102 includes a memory device that can store hardware configuration information and external connection information and a processing device coupled to the memory device. Initially, the first network device 102 does not have a role at the power-up event. The processing device, after the power-up event, can automatically recognize a role of the first network device 102 using the hardware configuration information and the external connection information. In this example, the first network device 102 determines, from the external connection information, that the role of the first network device 102 is a Router Node because an Internet Protocol (IP) address, which is assigned to a wide area network (WAN) port, is not part of a private subnet. That is the IP address, assigned to the WAN port, is not the same subnet as the private subnet of the first network device 102. For example, if the private subnet is 10.x.x.x and the IP address obtained from its WAN port is 204.x.x.x, the node will self-recognize as a Router node. Once recognized as the Router node, the first network device 102 automatically configures itself according to the Router Node role and automatically provisions itself to the network 100 without any manual intervention or manual configuration. In one embodiment, the processing device automatically configures the first network device 102 to provide a first Network Address Translation (NAT) service for the network 100 and assign IP addresses to child nodes with its private IP address space.

In the depicted embodiment, a network switch 104 is coupled to the first network device 102 (now Router Node) over a first wired interface 101 (e.g., wired Ethernet). In other network deployments, the network switch 104 may not be used.

Further, during network deployment, a second network device 106 is coupled to the network switch 104 over a second wired interface 103. The second network device 106 can be powered on at a power-up event. The second network device 106 does not initially have a role at the power-up event. The second network device 106 is assigned a first IP address by the Router Node (e.g., first network device 102). A processing device of the second network device 106 generates a Round Trip Time (RTT) timing report using Internet Control Message Protocol (ICMP) messages with the Router Node. The processing device of the second network device 106 determines a RTT value between the second network device 106 and the Router Node using the RTT timing report. The processing device determines that the RTT value is less than a first threshold and that the first IP address is part of a private subnet. In this example, the second network device 106 determines, from the external connection information, that the role of the second network device 106 is a Base Station Node because the RTT value is less than the first threshold and the first IP address is part of the private subnet. That is the IP address is the same subnet as the private subnet of the second network device 106. Alternatively, the second network device 106 recognizes itself as a Base Station Node if the IP address assigned to its WAN port is the same as the private subnet that the node recognizes and the RTT value to the Router Node falls within the specified criteria. Once the second network device 106 recognizes itself as a Base Station Node, the second network device 106 starts a first Provisioning Virtual Access Point that operates on a first frequency band, such as the UNII-3 5 GHz band. In one embodiment, the processing device of the second network device 106 bridges the second wired interface 103 (e.g., its Ethernet interface) with a first wireless interface and provides a wireless service downstream for Relay Nodes on the first frequency band (e.g., UNII-3 band). In another embodiment, the processing device automatically creates a first bridge, adds the second wired interface 103 and the first wireless interface to the first bridge, and assigns the first Provisioning Access Point to the first bridge. The processing logic uses the first bridge to connect the second wired interface 103 to the first wireless interface.

Further, during network deployment, a third network device 108 can be powered on at a power-up event. The third network device 108 does not initially have a role at the power-up event. Initially, the third network device 108 is not assigned an IP address by the Router Node. For example, there is no IP address assigned to a WAN port of the third network device 108. A processing device of the third network device 108 can detect a presence of the first Provisioning Virtual Access Point that operates on the first frequency band (e.g., UNII-3 5 GHz band). As described above, the first Provisioning Virtual Access Point is provided by the Base Station Node (e.g., third network device 108). In this example, the third network device 108 determines, from the external connection information, that the role of the third network device 108 is a Relay Node because there is no IP address assigned to the WAN port and the presence of the first Provisioning Virtual Access Point that operates on the first frequency band is detected. Once the third network device 108 recognizes itself as a Relay Node, the third network device 108 automatically configures the third network device 108 to associate with a first wireless interface 105 of the Base Station Node as a client and bridge the first wireless interface 105 with a third wired interface 107 to service Gateway Nodes downstream from the Relay Node. That is, the Relay Node connects to the Base Station Node as a client of the Base Station Node.

Further, during network deployment, a fourth network device 110 is coupled to the third network device 108 over the third wired interface 107. The fourth network device 110 can be powered on at a power-up event. The fourth network device 110 does not initially have a role at the power-up event. The fourth network device 110 is assigned a third IP address by the Router Node. A processing device of the fourth network device 110 generates a second RTT timing report using ICMP messages with the Router Node. The processing device of the fourth network device 110 a second RTT value between the fourth network device 110 and the Router Node using the second RTT timing report. The processing device determines that the second RTT value is greater than the first threshold and that the third IP address is part of a private subnet. In this example, the fourth network device 110 determines, from the external connection information, that the role of the fourth network device 110 is a Gateway Node because the second RTT value is greater than the first threshold and the third IP address is part of the private subnet. That is the IP address is the same subnet as the private subnet of the fourth network device 110. Alternatively, the fourth network device 110 recognizes itself as a Gateway Node if the IP address assigned to its WAN port is the same as the private subnet that the node recognizes and the second RTT value to the Router Node falls within the specified criteria. Once the fourth network device 110 recognizes itself as a Gateway Node, the fourth network device 110 starts a second Provisioning Virtual Access Point that operates on a second frequency band, such as the UNII-1 5 GHz band. In one embodiment, the processing device of the fourth network device 110 automatically configures the fourth network device 110 to bridge the third wired interface 107 with a second wireless interface 109 and provide a second wireless service downstream for CPE Nodes on the second frequency band (e.g., UNII-1 5 GHz band). In another embodiment, the processing device automatically creates a second bridge, adds the second wireless interface 109 and the third wired interface 107 to the second bridge, and associates the Relay Node with the first wireless interface 105 of the Base Station Node as a client (i.e., the Relay Node connects to the Base Station Node as a client). The processing logic uses the second bridge to connect the second wireless interface 109 to the third wired interface 107. In another embodiment, responsive to determining that the role of the network device is the Gateway Node, the processing device creates a second wireless distribution system (WDS) between the third wired interface 107 and the second wireless interface 109 and starts the second Provisioning Virtual Access point to provide a second wireless service on the second frequency band.

Further, during network deployment, a fifth network device 112 can be powered on at a power-up event. The fifth network device 112 does not initially have a role at the power-up event. Initially, the fifth network device 112 is not assigned an IP address by the Router Node. For example, there is no IP address assigned to a WAN port of the fifth network device 112. A processing device of the fifth network device 112 can detect a presence of the second Provisioning Virtual Access Point that operates on the second frequency band (e.g., UNII-1 5 GHz band). As described above, the second Provisioning Virtual Access Point is provided by the Gateway Node (e.g., fourth network device 110). In this example, the fifth network device 112 determines, from the external connection information, that the role of the fifth network device 112 is a CPE Node because there is no IP address assigned to the WAN port and the presence of the second Provisioning Virtual Access Point that operates on the second frequency band is detected. Once the fifth network device 112 recognizes itself as a CPE Node, the fifth network device 112 automatically configures the fifth network device 112 to associate with a second wireless interface of a Gateway Node as a client, provides a second NAT service for the network 100, and provides a third wireless service downstream for client devices on a third frequency band (e.g., 2.4 GHz) that is different than the first frequency band and the second frequency band. That is, the processing device can associate with the Gateway's wireless interface as a client and provide NAT services to its downstream clients through its additional wireless radios. In another embodiment, the processing device creates a second NAT table for the second wireless service and associates the CPE Node with the second wireless interface 109 of the Gateway Node as a client. In another embodiment, the CPE Node connects to the Gateway Node as a client of the Gateway Node.

In another embodiment, during network deployment, a sixth network device 114 is coupled to the third network device 108 (Relay Node) over a fourth wired interface 111. The fourth network device 110 can be powered on at a power-up event. The sixth network device 114 does not initially have a role at the power-up event. The sixth network device 114 is assigned a fourth IP address by the Router Node. A processing device of the sixth network device 114 generates a third RTT timing report using ICMP messages with the Router Node. The processing device of the sixth network device 114 determines a third RTT value between the sixth network device 114 and the Router Node using the third RTT timing report. The processing device determines that the third RTT value is greater than the first threshold and that the fourth IP address is part of a private subnet. In this example, the sixth network device 114 determines, from the external connection information, that the role of the sixth network device 114 is a Gateway Node because the third RTT value is greater than the first threshold and the fourth IP address is part of the private subnet. That is the IP address is the same subnet as the private subnet of the sixth network device 114. The sixth network device 114 is a second Gateway Node that is connected to the Relay node. Alternatively, the sixth network device 114 recognizes itself as a Gateway Node if the IP address assigned to its WAN port is the same as the private subnet that the node recognizes and the third RTT value to the Router Node falls within the specified criteria. Once the sixth network device 114 recognizes itself as a Gateway Node, the sixth network device 114 starts a second Provisioning Virtual Access Point that operates on a second frequency band, such as the UNII-1 5 GHz band. A CPE Node can detect the second Provisioning Virtual Access Point that operates on either the fourth network device 110 or the sixth network device 114. In one embodiment, the processing device of the sixth network device 114 automatically configures the sixth network device 114 to bridge the fourth wired interface 111 with a third wireless interface and provide the second wireless service downstream for CPE Nodes on the second frequency band (e.g., UNII-1 5 GHz band). In another embodiment, the processing device automatically creates a third bridge, adds a wireless interface and the fourth wired interface 111 to the third bridge, and associates the Relay Node with the first wireless interface 105 of the Base Station Node as an additional client (e.g., the Relay Node connects to the Base Station Node as a client). The processing logic uses the third bridge to connect the wireless interface to the fourth wired interface 111. In another embodiment, responsive to determining that the role of the network device is the Gateway Node, the processing device creates or adds to the second WDS and starts the second Provisioning Virtual Access point to provide the second wireless service on the second frequency band. In other embodiments, additional network devices can be coupled to the Relay Node and self-recognize as additional Gateway Nodes.

As described with respect to the fifth network device 112, additional network devices 116, 118 can be powered on and can self-recognize as CPE Nodes that connect to the Gateway Node at the sixth network device 114. In addition, as described with respect to the third network device 108, additional network devices 122, 128 can be powered on and can self-recognize as Relay Nodes that connect to the Base Station Node at the second network device 106. Similarly, the network devices 124, 130 can be powered on and can self-recognize as Gateway Nodes and the network devices 126, 132 can be powered on and can self-recognize as CPE Nodes that connect to the respective Gateway Nodes.

Further, during network deployment, a seventh network device 120 is coupled to the network switch 104 over a fifth wired interface 113 (e.g., Ethernet interface). The seventh network device 120 can be powered on at a power-up event. The seventh network device 120 does not initially have a role at the power-up event. The seventh network device 120 can be assigned a fourth IP address by the Router Node. A processing device of the seventh network device 120 can determine that a storage device is attached to a hardware port of the seventh network device 120. In this example, the seventh network device 120 determines, from the hardware configuration information, that the role of the seventh network device 120 is a Storage Node because the storage device is attached to the hardware port. Once the seventh network device 120 recognizes itself as a Storage Node, the seventh network device 120 automatically configures the seventh network device 120 to provide network storage and local caching for the network 100 through the fifth wired interface 113. In another embodiment, once the seventh network device 120 recognizes itself as a Storage Node, the seventh network device 120 initiates a content service daemon to monitor for request for content data on the fifth wired interface 113. Alternatively, the content service daemon can monitor for requests for content data on a wireless interface when a Node is a hybrid node that includes storage, such as a Relay node with storage services or a Base Station Node with storage services. The request for content data can originate from any network devices or end-point devices connected to the network 100.

As described above with respect to FIG. 1, a set of well-defined node roles allows any device to self-recognize, self-reconfigure and automatic form complex network topologies, such as the network 100 illustrated in FIG. 1, without any manual intervention or configuration. It should also be noted that although described at power-up events, the network devices can be self-repurposed to other roles to maximize reusability and reduce cost of the deployment. For example, one of the network devices that is initially used as a Gateway Node can be deployed in other parts of the network 100 or another network, and the network device can perform the role recognition, configuration, and provisioning processes again to self-recognize its role, self-configure according to the role, and self-provision to the network, as described above.

As described above, when a network device recognizes itself as either a Base Station Node or a Gateway Node, the network device performs the RTT timing report measurement against a Default Gateway device (i.e., the Router Node in network 100) using ICMP messages, such as described and illustrated below with respect to FIGS. 2A-2C.

Figure 2A:
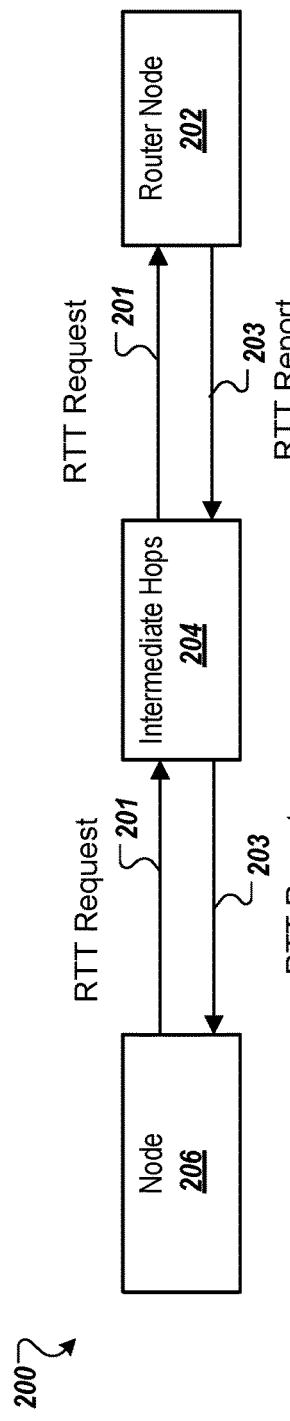
FIG. 2A illustrates a functional diagram of a Round Trip Time (RTT) timing report measurement of a path between a Node and a Router Node according to one embodiment.

FIG. 2A illustrates a functional diagram of a RTT timing report measurement 200 of a path between a Node 206 and a Router Node 202 according to one embodiment. For the RTT timing report measurement 200, a Node 206 sends a RTT request 201, such as in an ICMP message, to the Router Node 202. The RTT request 201 is sent to the Router Node 202 by way of one or more intermediate hops 204. The one or more intermediate hops 204 can include one or more of various devices, such as a network switch, a Base Station Node, or a Relay Node. The one or more intermediate hops 204 send the RTT request 201 to the Router Node 202. The Router Node 202 sends back a RTT report 203 back to the node 206 via the one or more intermediate nodes. Based on the number of intermediate hops 204, the RTT request 201 and the RTT report 203 can be used to determine an amount of time it takes for a signal to be sent to and returned from the Router Node 202. In networks, the signal is generally a data packet. The Node 206 can execute a command, such a ping command, to send a packet to the Router Node 202. The Node 206 can send the packet using ICMP. ICMP can be used to send error messages and operational information when communicating with a device having an IP address. The amount of time is referred to as a RTT value. Various delays can add to the RTT value, including, for example, processing latency at the Router Node, processing latency of any intermediate network switch, processing latency of a network device itself, processing latency of an intermediate Relay Node, a wireless backoff latency, a Short Interframe Space (SIFS), air transmission time, or the like. The RTT value can be used to help a network device self-recognize its role, such as illustrated with respect to FIG. 2B-2C. SIFS is an amount of time for which a receiver waits before sending a clear to send (CTS) and acknowledgement package to a sender and the sender waits after receiving CTS and before sending data to a receiver. SIFS is used to avoid any type of collisions. DCF Interframe spacing (DIFS) is the time delay for which a sender waits after completing a backoff delay, before sending a ready to send (RTS) package. Arbitrary Interframe spacing (AIFS) can be used by the Access point (AP) to prioritize priority traffic (e.g., AIFS1, AIFS4). PCF Interframe spacing (PIFS) is a shorter duration than DIFS to occupy the wireless medium. The wireless backoff latency is the amount of time that the sender has to wait to transmit data in response to an event, such as a collision. The wireless backoff latency can be determined by one or more backoff algorithms used by a communication protocol, such as a collision avoidance mechanism to schedule a transmission or a re-transmission after collisions. The air transmission time is the amount of time from the beginning until the end of a message transmission over a wireless medium. The air transmission time can include the time of sending the message and receiving an acknowledgment. In the RTT calculations, the air transmission time can include an amount of time for the transmission in a first direction and an amount of time for transmission in the opposite direction.

Figure 2B:
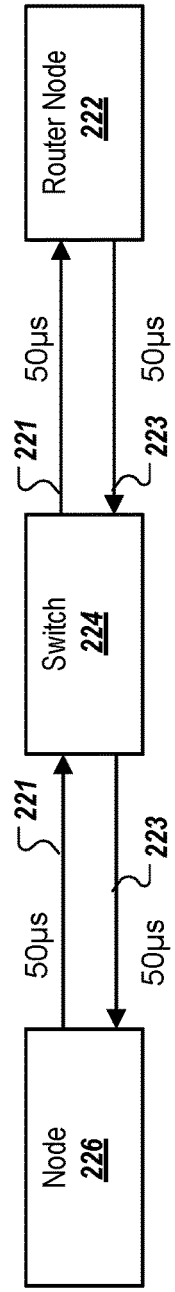
FIG. 2B illustrates a functional diagram of a RTT timing report measurement of a path between a Node and a Router Node, where there is only a network switch as an intermediate hop between the Node and the Router Node according to one embodiment.

FIG. 2B illustrates a functional diagram of a RTT timing report measurement 220 of a path between a Node and a Router Node, where there is only a network switch as an intermediate hop between the Node and the Router Node according to one embodiment. For the RTT timing report measurement 220, a Node 226 sends a RTT request 221, such as in an ICMP message, to the Router Node 222. The RTT request 221 is sent to the Router Node 222 by way of a single network switch 224. The Router Node 202 responds by sending a RTT report 223 back to the Node 226 via the network switch 224. The Node 226 can determine an RTT value using the RTT report 223. The RTT value includes latency in a forward path between the Node 226 and the Router Node 222 and a return path between the Router Node 222 and the Node 226. The forward path can include processing latency caused by the Node 226, propagation delay between the Node 226, processing latency caused by the network switch 224, propagation delay between the network switch 224 and the Router Node 222, and processing latency caused by the Router Node 222. The return path can include processing latency caused by the Router Node 222, propagation delay between the Router Node 222, processing delay caused by the network switch 224, propagation delay between the network switch and the Node 226, and processing delay by the Node 226. For example, the delays can be represented as a first delay (e.g., 50 microseconds (µs)) to deliver the RTT request 221 to the network switch 224, a second delay (e.g., 50 µs) to deliver the RTT request 221 to the Router Node 222, a third delay (e.g., 50 µs) to deliver the RTT response 223 to the network switch 224, and a fourth delay (e.g., 50 µs) to deliver the RTT report 223 to the Node 226. The RTT value can be computed as a sum of all the delays. In the example of 50 µs delays for the four delays, the RTT value would be 200 µs. The RTT value can be compared against a threshold or compared to specified criteria to help recognize a role for the Node 226. For example, a first threshold could be set at 250 µs so that RTT values less than the first threshold can allow the network device to identify as a Base Station Node, whereas RTT values greater than the threshold can allow the network device to identify as a Gateway Node, such as illustrated and described below with respect to FIG. 2C.

Figure 2C:
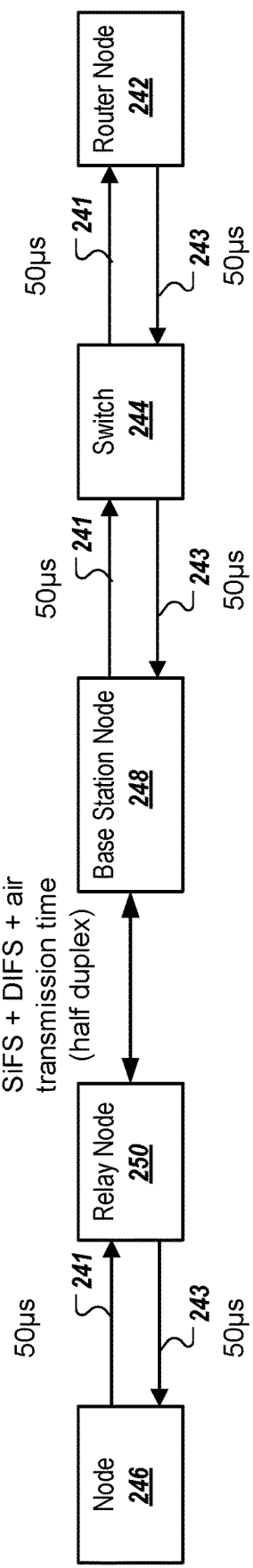
FIG. 2C illustrates a functional diagram of a RTT timing report measurement of a path between a Node and a Router Node, where there are more intermediate hops between the Node and the Router Node according to one embodiment.

FIG. 2C illustrates a functional diagram of a RTT timing report measurement of a path between a Node and a Router Node, where there are more intermediate hops between the Node and the Router Node according to one embodiment. For the RTT timing report measurement 240, a Node 246 sends a RTT request 241, such as in an ICMP message, to the Router Node 242. The RTT request 241 is sent to the Router Node 242 by way of multiple intermediate hops, including a network switch 244, a Base Station Node 248, and a Relay Node 250. The Router Node 242 responds by sending a RTT report 243 back to the Node 246 via the network switch 244, Base Station Node 248, and the Relay Node 250. The Node 246 can determine an RTT value using the RTT report 243. The RTT value includes latency in a forward path between the Node 246 and the Router Node 242 and a return path between the Router Node 242 and the Node 246. The forward path can include processing latency caused by the Node 246, Relay Node 250, network switch 244, and Router Node 242, propagation delay between each of the nodes, as well as additional delays caused at the wireless connection between the Relay Node 250 and Base Station Node 248. The return path can include processing latency caused by the Node 246, Relay Node 250, network switch 244, and Router Node 242, propagation delay between each of the nodes, as well as additional delays caused at the wireless connection between the Base Station Node 248 and the Relay Node 250. The delays caused by the wireless communication between the Relay Node 250 and the Base Station Node 248 can include a wireless backoff latency, a Short Interframe Space (SiFS), DCF Inter-Frame Space (DIFS), air transmission time, or the like. The RTT value can be compared against the first threshold or a second threshold or compared to specified criteria to help recognize a role for the Node 226. For example, a first threshold could be set at 250 μs so that RTT values greater than the first threshold can allow the network device to identify as a Gateway Node. The RTT value allows, along with the specified criteria (e.g., thresholds, ranges, or the like), facilitate distinguishing a Node as either a Gateway Node or a Base Station Node. For example, when a node recognizes itself as either a Base Station or Gateway Node based on a first condition, the node can perform the RTT timing report measurements against the Router Node using ICMP. The Round Trip Time between a Base Station Node and the Router Node can be determined as a sum of the processing latency of the Router Node, processing latency of the intermediate switch, and the processing latency of the node itself. In comparison, the RTT between a Gateway Node and the Router Node can be determined as a sum of the processing latency of the Router node, processing latency of the intermediate switch, processing latency of the node itself, processing latency of the Relay Node, wireless backoff latency (DCF Interframe Space (e.g., 34 μs), SiFS (e.g., 16 μs), and air transmission time. Using the delta delay introduced by the wireless transmission of the Relay node, the new node can determine a role of the node base on the Round Trip Time measurement report. Alternatively, the RTT value can be used as an additional check on where the network device is in the network topology.

Figure 3:
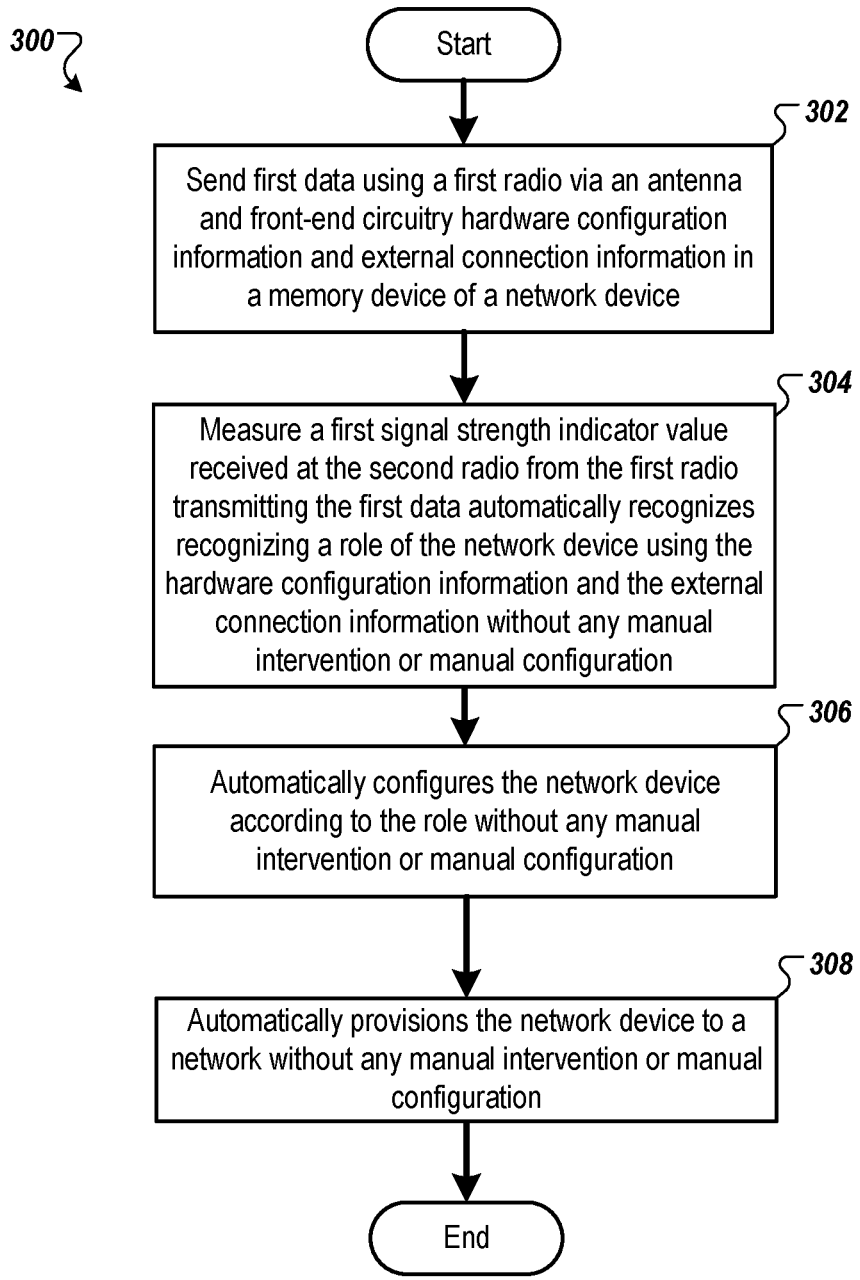
FIG. 3 is a flow diagram of a method of self-provisioning a network device to a network according to one embodiment.

FIG. 3 is a flow diagram of a method 300 for deploying a network device in a network according to one embodiment. The method 300 may be performed by processing logic that comprises hardware (e.g., circuitry, dedicated logic, programmable logic, microcode, etc.), software, firmware, or a combination thereof. In one embodiment, the method 300 may be performed by any of the devices described herein and illustrated with respect to FIGS. 1-2.

Referring back to FIG. 3, the method 300 begins by storing hardware configuration information and external connection information in a memory device of a network device (block 302). The processing logic automatically recognizes recognizing a role of the network device using the hardware configuration information and the external connection information without any manual intervention or manual configuration (block 304). The role of the network device is at least one of a Router Node, a Storage Node, a Base Station Node, a Relay Node, a Gateway Node, or a CPE Node. The processing logic automatically configures the network device according to the role without any manual intervention or manual configuration (block 306). The processing logic automatically provisions the network device to a network without any manual intervention or manual configuration (block 308), and the method 300 ends. Additional details of the operations at blocks 304-308 are described below with respect to FIGS. 4-9.

Figure 4:
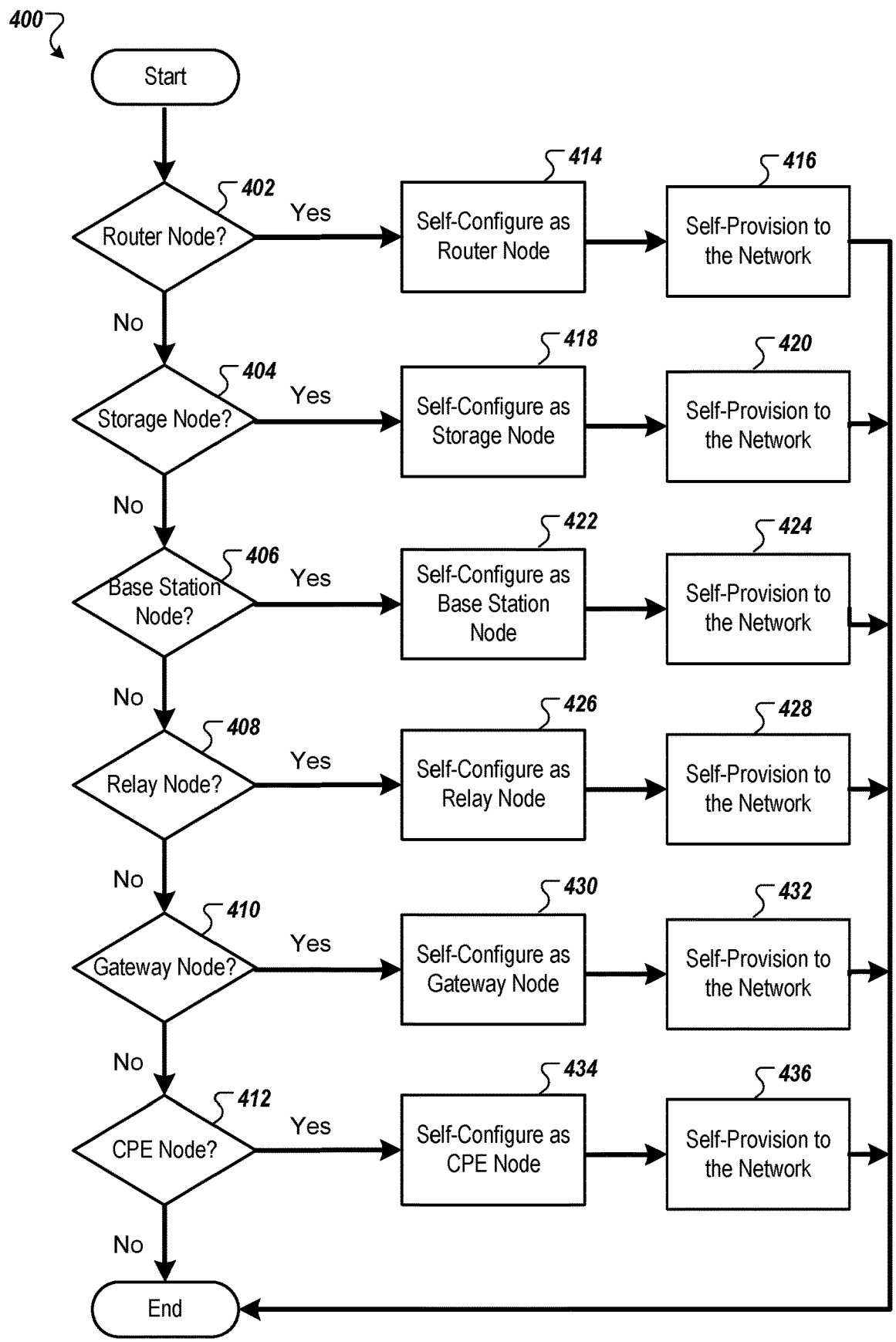
FIG. 4 is a flow diagram of a method for automatically recognizing a role of a network device according to one embodiment.

FIG. 4 is a flow diagram of a method 400 for automatically recognizing a role of a network device according to one embodiment. The method 400 may be performed by processing logic that comprises hardware (e.g., circuitry, dedicated logic, programmable logic, microcode, etc.), software, firmware, or a combination thereof. In one embodiment, the method 400 may be performed by any of the devices described herein and illustrated with respect to FIGS. 1-2.

Referring back to FIG. 4, the method 400 begins by determining, from the external connection information, whether the role of the network device is a Router Node (block 402). The processing logic can determine that the role is the Router Node responsive to a determination that an IP address, which is assigned to a WAN port, is not part of a private subnet. That is the IP address is not part of the same subnet as the private subnet of the network device. The processing logic determines, from the hardware configuration information, whether the role of the network device is a Storage Node (block 404). The processing logic can determine that the role is the Storage Node responsive to a determination that a storage device is attached to a hardware port of the processing device. The processing logic determines, from the external connection information, whether the role of the network device is a Base Station Node (block 406). The processing logic can determine that the role is the Base Station Node responsive to a determination that i) the IP address is part of the private subnet and ii) a RTT value to a Router Node is within a first specified criteria. The processing logic determines, from the external connection information, whether the role of the network device is a Relay Node (block 408). The processing logic can determine that the role is the Relay Node responsive to a determination that iii) there is no IP address assigned to the WAN port and iv) a presence of a first Provisioning Virtual Access Point that operates on a first frequency band is detected. The first frequency band can be the UNII-3 5 GHz band, which is 4.725-5.840 GHz. The processing logic determines, from the external connection information, whether the role of the network device is a Gateway Node (block 410). The processing logic can determine that the role is the Gateway Node responsive to a determination that v) the IP address is part of the private subnet and vi) the RTT value to the Router Node is within a second specified criteria that is different than the first specified criteria. The processing logic determines, from the external connection information, whether the role of the network device is a CPE Node (block 412).

The processing logic can determine that the role is the CPE Node responsive to a determination that vii) there is no IP address assigned to the WAN port and viii) a presence of a second Provisioning Virtual Access Point that operates on a second frequency band is detected. The second frequency band is different than the first frequency band. The second frequency band can be the UNII-1 band at 5.150-5.250 GHz.

Once the processing logic determines that the network device has a role of Router Node at block 402, the processing logic can self-configure the network device as the Router Node (block 414) and self-provision the network device to the network (block 416). Once the processing logic determines that the network device has a role of Storage Node at block 404, the processing logic can self-configure the network device as the Storage Node (block 418) and self-provision the network device to the network (block 420). Once the processing logic determines that the network device has a role of Base Station Node at block 406, the processing logic can self-configure the network device as the Base Station Node (block 422) and self-provision the network device to the network (block 424). Once the processing logic determines that the network device has a role of Relay Node at block 408, the processing logic can self-configure the network device as the Relay Node (block 426) and self-provision the network device to the network (block 428). Once the processing logic determines that the network device has a role of Gateway Node at block 410, the processing logic can self-configure the network device as the Gateway Node (block 430) and self-provision the network device to the network (block 432). Once the processing logic determines that the network device has a role of CPE at block 412, the processing logic can self-configure the network device as the CPE Node (block 434) and self-provision the network device to the network (block 436).

Figure 5:
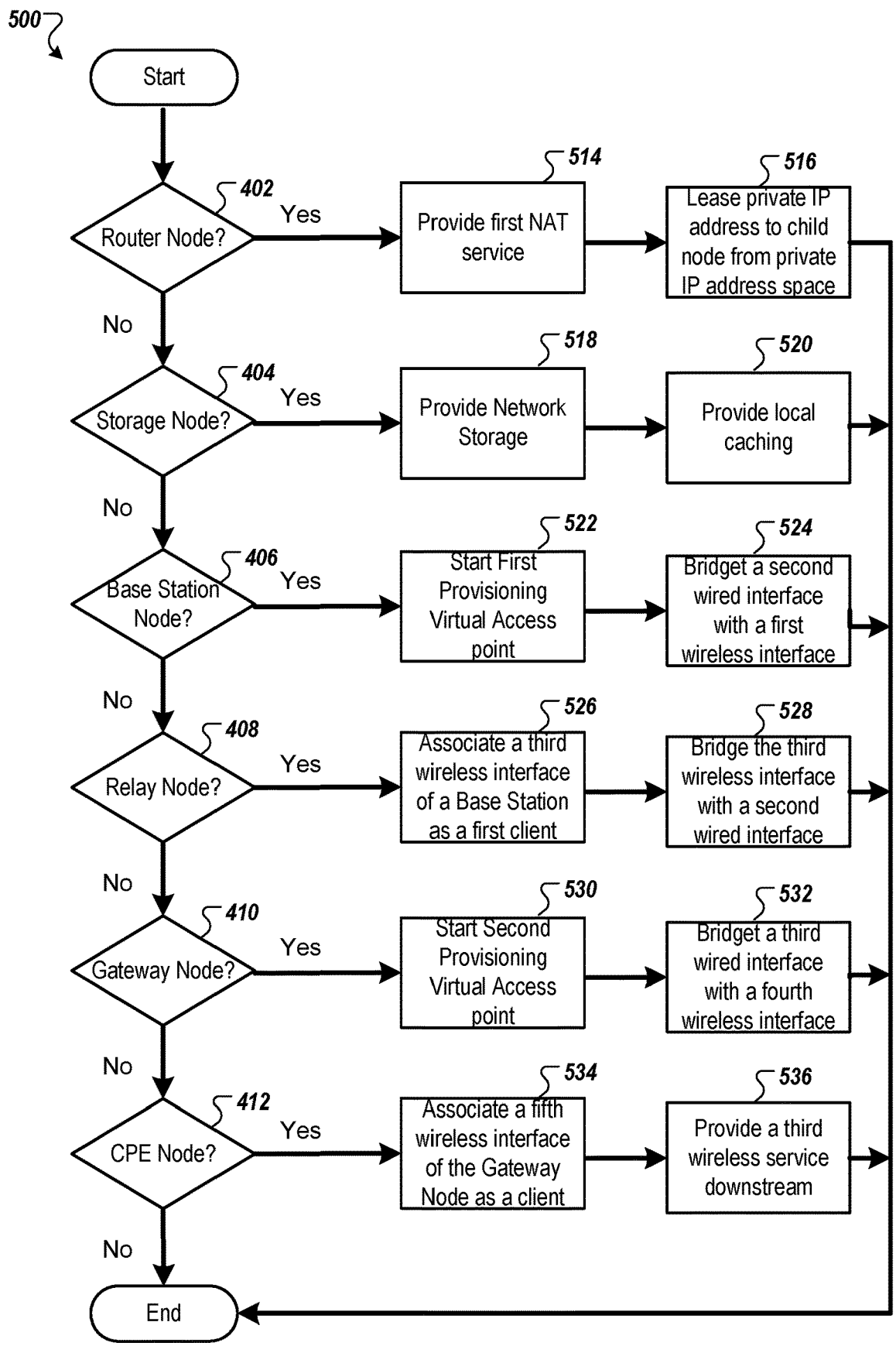
FIG. 5 is a flow diagram of a method for automatically configuring the network device according to a self-recognized role according to one embodiment.

FIG. 5 is a flow diagram of a method 500 for automatically configuring the network device according to a self-recognized role according to one embodiment. The method 500 may be performed by processing logic that comprises hardware (e.g., circuitry, dedicated logic, programmable logic, microcode, etc.), software, firmware, or a combination thereof. In one embodiment, the method 500 may be performed by any of the devices described herein and illustrated with respect to FIGS. 1-2.

Referring back to FIG. 5, the method 500 begins by, responsive to determining that the role of the network device is the Router Node at block 402 as described above, automatically configuring the network device to provide a first NAT service for the network (block 514) and lease a private IP address to a child node within a private IP address space of the Router Node (block 516). Responsive to determining that the role of the network device is the Storage Node at block 404, the processing logic automatically configures the network device to provide network storage (block 518) and local caching for the network through a first wired interface (block 520). Once the node recognizes itself as a Base Station Node at block 406, the processing logic starts a Provisioning Virtual Access Point that operates on the UNII-3 5 GHz band (block 522) and automatically configures the network device to bridge a second wired interface with a first wireless interface and provide a first wireless service downstream for Relay Nodes on the first frequency band. Responsive to determining that the role of the network device is the Relay Node at block 408, the processing logic automatically configures the network device to associate with a third wireless interface of a Base Station Node as a first client (block 526) and bridge the third wireless interface with a second wired interface to service Gateway Nodes downstream from the Relay Node (block 528). For example, the Relay Node associates with the Base Station's wireless interface as a client and bridges its client interface with its Ethernet interface to service downstream Gateway Nodes. Responsive to determining that the role of the network device is the Gateway Node at block 410, the processing logic automatically configures the network device to start a Second Provisioning Virtual Access Point (block 530) and bridge a third wired interface with a fourth wireless interface and provide a second wireless service downstream for CPE Nodes on the second frequency band (block 532). For example, the Gateway Node bridges its Ethernet interface with its Wireless Interface and provides wireless service downstream for Customer Premises Nodes on UNII-1 band. Responsive to determining that the role of the network device is the CPE Node at block 412, the processing logic automatically configures the network device to associate with a fifth wireless interface of a Gateway Node as a second client, provide a second NAT service for the network (block 534), and provide a third wireless service downstream for client devices on a third frequency band (block 536). The third frequency is different than the first frequency band and the second frequency band. For example, the third wireless service can be provided on 2.4 GHz frequency band. The CPE Node can associate with the Gateway's wireless interface as a client and provides Network Address Translation service to its downstream clients through its additional wireless radios.

In another embodiment, the processing logic automatically configures the network device as follows: responsive to determining that the role of the network device is the Router Node, the processing logic automatically creates a first NAT table at block 514. The first NAT table comprises an entry that maps the IP address to the private IP address for the child node. The first NAT table can be used for routing decisions by the Router Node. Responsive to determining that the role of the network device is the Storage Node, the processing logic can initiate a content service daemon. At block 518, the content service daemon can monitor for requests for content data (e.g., audio-video data) on the first wired interface. Responsive to determining that the role of the network device is the Base Station Node at block 406, the processing logic can automatically create a first bridge, add the second wired interface and the first wireless interface to the first bridge, and assign the first Provisioning Access Point to the first bridge. The processing logic uses the first bridge to connect the second wired interface and the first wireless interface. Responsive to determining that the role of the network device is the Relay Node at block 408, the processing logic can automatically create a second bridge, add the third wireless interface and the second wired interface to the second bridge, and associate the Relay Node with the first wireless interface of the Base Station Node as the first client. The processing logic uses the second bridge to connect the third wireless interface to the second wired interface. Responsive to determining that the role of the network device is the Gateway Node at block 410, the processing logic can automatically create a third bridge, add the third wired interface and the fourth wireless interface to the third bridge, and assign the second Provisioning Access Point to the third bridge. The processing logic uses the third bridge to connect the third wired interface to the fourth wireless interface. Responsive to determining that the role of the network device is the CPE Node at block 412, the processing logic can create a second NAT table and associate the CPE Node with the fourth wireless interface of the Gateway Node as the second client. The second NAT table can includes entries that map private IP addresses of an IP address space of the Gateway Node to private IP address of an IP address space of the children nodes, such as the CPE Node(s). The second NAT table can be used for routing decisions by the Gateway Node.

In another embodiment, responsive to determining that the role of the network device is the Base Station Node at block 406, the processing logic can create a first WDS between a second wired interface and a first wireless interface. The processing logic can start the first Provisioning Virtual Access Point to provide a first wireless service on the first frequency band. The processing logic, responsive to determining that the role of the network device is the Gateway Node at block 410, can create a second WDS between a third wired interface and a fourth wireless interface and start the second Provisioning Virtual Access point to provide a second wireless service on the second frequency band.

All new nodes joining the network go through a self-provisioning process before the node is allowed to be on the network. For example, the self-provisioning process can include the following sequence: upon powering up, the new node first scans for the Provision Virtual Access Point that is being broadcasted by either the Base Station Node or the Gateway Node. Once the Access Point is detected, the new node automatically connects to the Access Point and using its own certificates. The Base Station or Gateway Node relays the new node's certificate to the cloud to verify the device manufacturing record. Once the device manufacturing record is verified, the cloud sends remote command to command the new node to generate a new certificate that is used to connect to the normal service network. The new node then disassociates from the Provision Virtual Access Point and connects to the normal service network. The self-provisioning process can include two phases, device manufacturing identity verification and device authentication, such as illustrated and described below with respect to FIG. 6.

Figure 6:
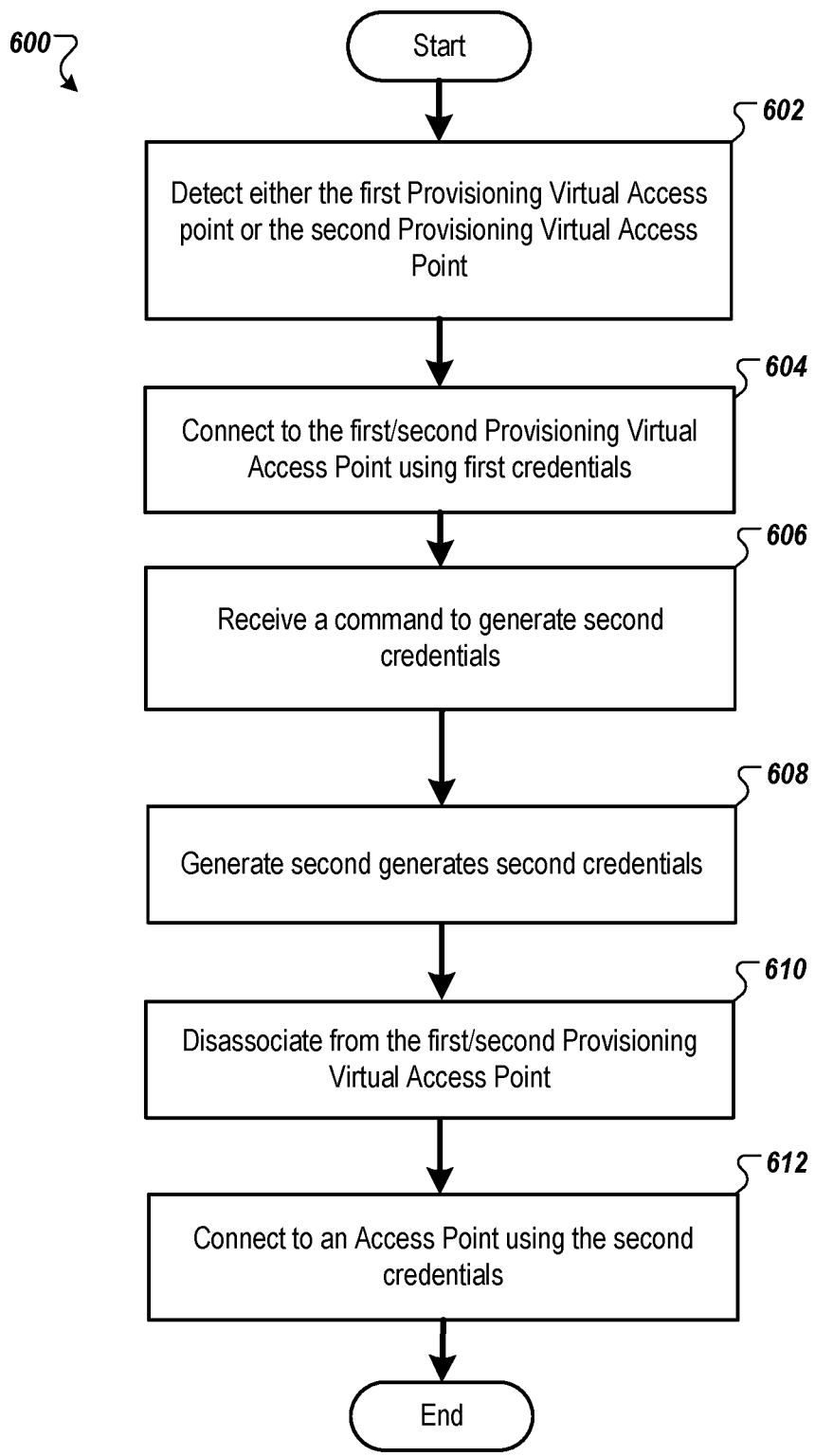
FIG. 6 is a flow diagram of a method of self-provisioning a network device to a network according to one embodiment.

FIG. 6 is a flow diagram of a method 600 of self-provisioning a network device to a network according to one embodiment. The method 600 may be performed by processing logic that comprises hardware (e.g., circuitry, dedicated logic, programmable logic, microcode, etc.), software, firmware, or a combination thereof. In one embodiment, the method 600 may be performed by any of the devices described herein and illustrated with respect to FIGS. 1-2.

Referring back to FIG. 6, the method 600 begins by detecting at least one of the first Provisioning Virtual Access Point or the second Provisioning Virtual Access Point (block 602). The processing logic connects to the at least one of the first Provisioning Virtual Access Point or the second Provisioning Virtual Access point using first credentials (block 604). The first credentials can be pre-stored on the network device, such as manufacturing credentials. The first credentials can be used to verify against a device manufacturing record stored in a cloud service. The Base Station or Gateway Node relays the node's first credentials (e.g., keys, certificates, or the like) to the cloud to verify the device manufacturing record. Once the first credentials are verified, the processing logic receives a remote command to generate second credentials (block 606). The processing logic generates the second credentials (block 608). The processing logic disassociates from the at least one of the first Provisioning Virtual Access Point or the second Provisioning Virtual Access point (block 610). The processing logic connects to at least one of a first Access Point of the Base Station Node using the second credentials or a second Access Point of the Gateway Node using the second credentials (block 612), and the method 600 ends.

Figure 7:
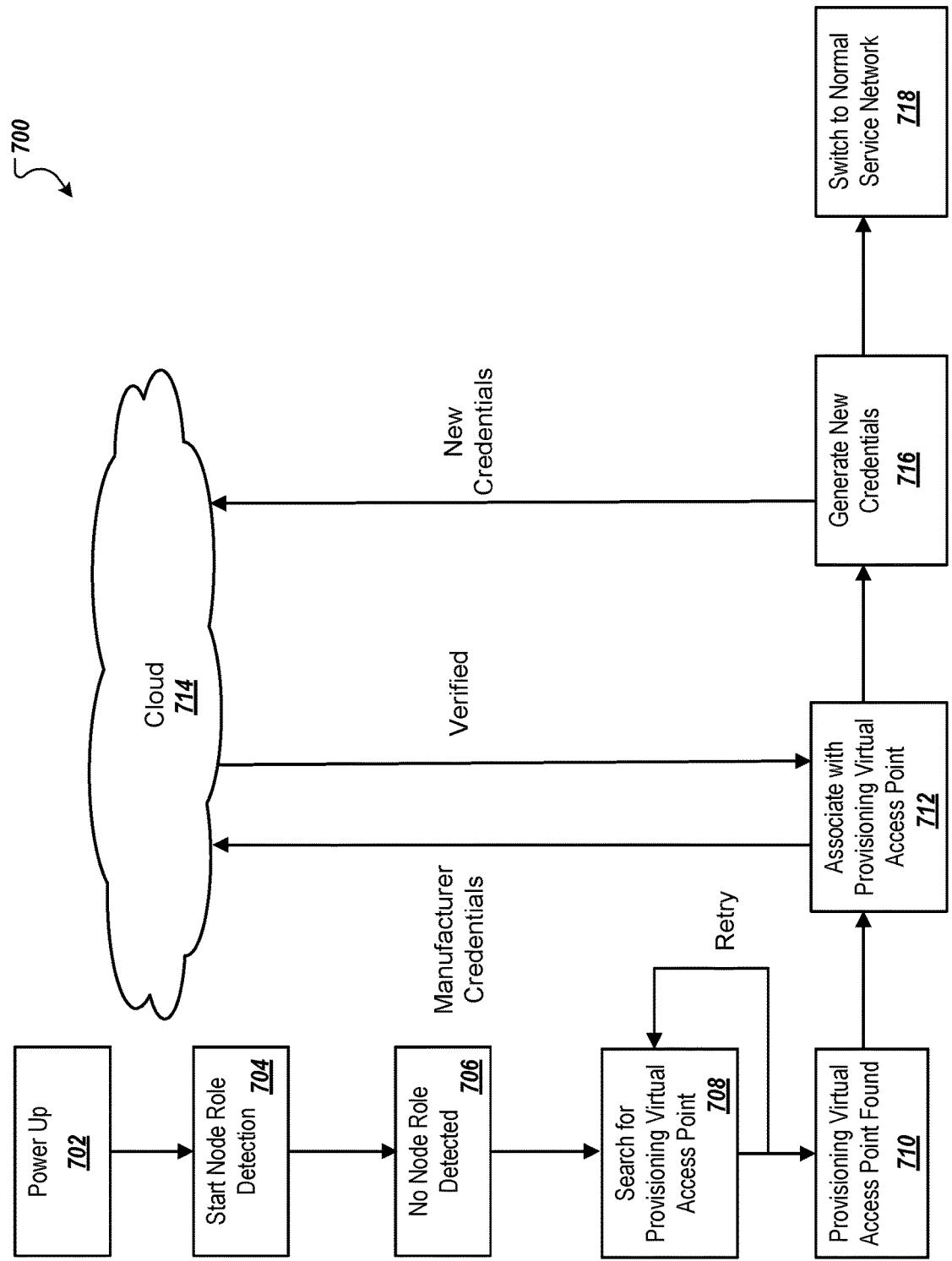
FIG. 7 is a flow diagram of another method of self-provisioning a network device to a network according to one embodiment.

FIG. 7 is a flow diagram of another method 700 of self-provisioning a network device to a network according to one embodiment. The method 700 may be performed by processing logic that comprises hardware (e.g., circuitry, dedicated logic, programmable logic, microcode, etc.), software, firmware, or a combination thereof. In one embodiment, the method 700 may be performed by any of the devices described herein and illustrated with respect to FIGS. 1-2.

Referring back to FIG. 7, the method 700 begins by powering up the network device (block 702). The processing logic starts a first process that automatically recognizes the role of the network device (block 704). At block 706, after starting the first process, the processing logic can determine that no role is detected. Responsive to determining that no role is detected, the processing logic searches for and detects a first Provisioning Virtual Access Point (or a second Provisioning Virtual Access Point) (block 708). The processing logic associates with the first Provisioning Virtual Access Point (block 710). The processing logic sends first credentials 701 to an authentication service 714 at a remote server (illustrated as a cloud service). The processing logic receives a response 703 from the authentication service 714 that the first credentials are verified. As a result, the processing logic generates second credentials and sends the second credentials to the authentication service (block 716). The processing logic connects to an access point using the second credentials (block 718), and the method 700 ends.

In another embodiment, the processing logic starts a second Provisioning Virtual Access Point. Via the second Provisioning Virtual Access Point, the processing logic receives a request to associate a second network device with the second Provisioning Virtual Access Point. The processing logic receives third credentials from the second network device and forwards the third credentials to the authentication service 714 at the remote server. The processing logic receives a response from the authentication service that the third credentials are verified and sends the response to the second network device. The second network device can similarly receive and forward requests to the authentication service to provision additional network devices.

In another embodiment, the processing logic, to recognize the role, can determine, from the external connection information, that the IP address is part of the private subnet. Responsive to determining that the IP address is part of the private subnet, the processing logic generates a RTT timing report using ICMP messages with the Router Node. The processing logic determines a RTT value between the network device and the Router Node using the RTT timing report. The processing logic determines, from the external connection information, whether the role of the network device is the Base Station Node or the Gateway Node. The processing logic can determine that the role is the Base Station Node responsive to a determination that the RTT value is less than a specified value. The RTT value being less than the specified value corresponds to a first amount of time that includes processing latency at the Router Node, processing latency of any intermediate network switch, and processing latency of the network device itself. The processing logic can determine that the role is the Gateway Node responsive to a determination that the RTT value is greater than the specified value. The RTT value being greater than the specified value corresponds to a second amount of time that includes processing latency at the Router Node, processing latency of any intermediate network switch, processing latency of the network device itself, processing latency of an intermediate Relay Node, a wireless backoff latency, a Short Interframe Space, and air transmission time. The second amount of time is greater than the first amount of time. Specified criteria can be defined to distinguish between RTT values for Gateway Nodes and RTT values for Base Station Nodes.

Figure 8:
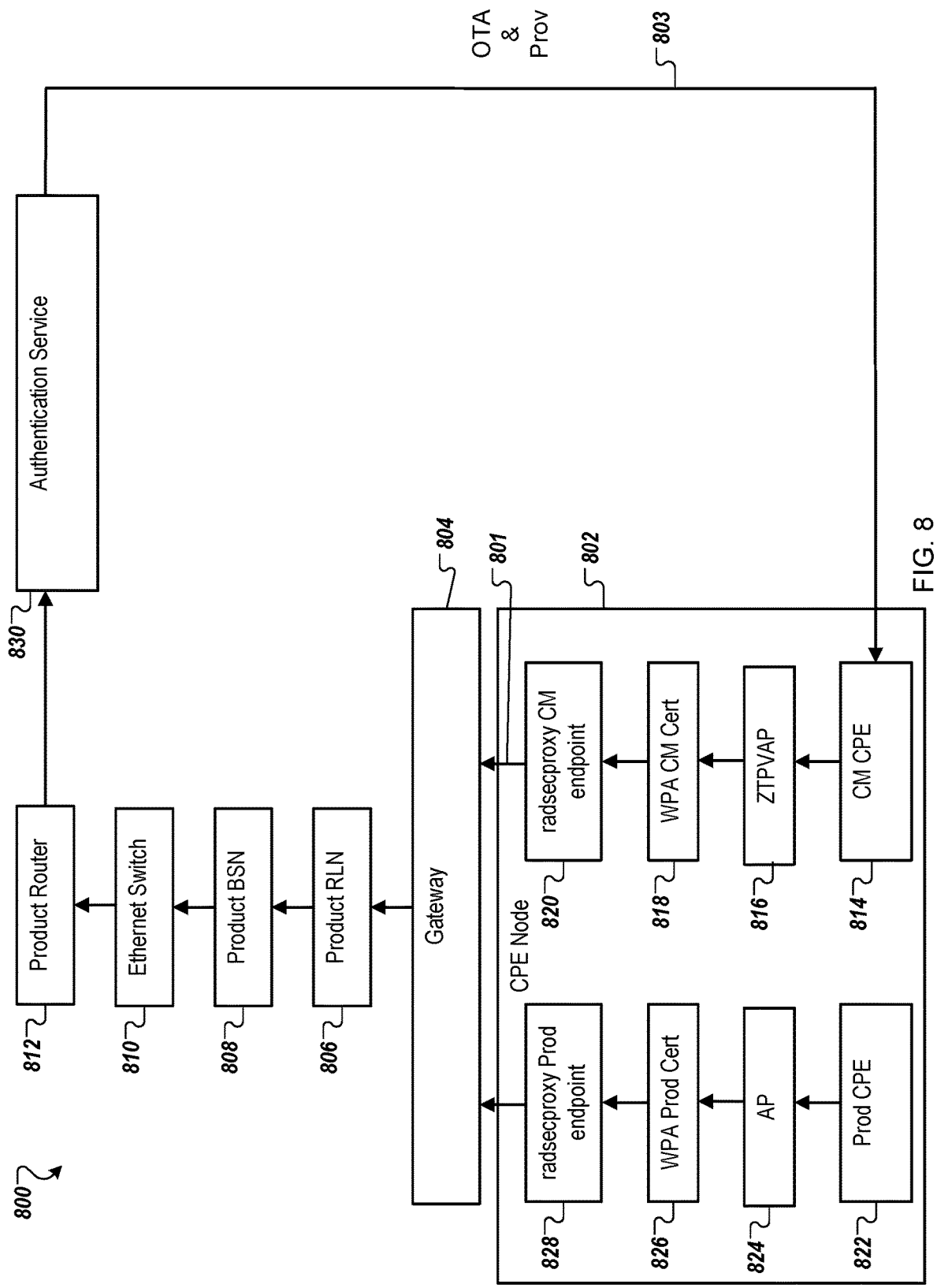
FIG. 8 is a flow diagram of a method for authenticating a Customer Premises Equipment (CPE) Node to a network according to one embodiment.

FIG. 8 is a flow diagram of a method 800 for authenticating a CPE node to a network according to one embodiment. The method 800 may be performed by processing logic that comprises hardware (e.g., circuitry, dedicated logic, programmable logic, microcode, etc.), software, firmware, or a combination thereof. In one embodiment, the method 800 may be performed by any of the devices described herein and illustrated with respect to FIGS. 1-2.

Referring back to FIG. 8, the method 800 begins by the processing logic of the CPE node 802 detecting and connecting to a Virtual Access Point, provided by a Gateway Node 804. To detect and connect to the Virtual Access Point, the processing logic can include a first processing thread that handles connecting to the Virtual Access Point, provided by the Gateway Node 804, and sending first credentials to an authentication service (e.g., a cloud service that authenticates the CPE node 802 via the Virtual Access Point. The first processing thread may include various functions, including CM CPE 814, provisioning Virtual Access Point (ZTPVAP) 816, Wi-Fi® Protected Access (WPA) CM Cert 818, and radsecproxy CM endpoint 820 for processing and sending an authorization request 801 to the authorization server with first credentials. The CPE node 802 sends the authorization request 801. The Gateway Node 804 forwards the authorization request 801 to a Router Node 812, through one or more intermediate hops, such as a Relay Node 806, a Base Station Node 808, and an Ethernet switch 810, for example. The Router Node 812 sends the authorization request 801, with the first credentials, to the authentication service 830. The authentication service 180 can verify the first credentials, such as comparing the first credentials against a manufacturing record stored in a database. Once the first credentials are verified, the authentication service can send a command 803 back to the CPE Node 802. The command 803 instructs the CPE Node 802 to generate new credentials and connect to an Access Point of the network. The Access Point is provided by the Gateway Node 804. The Access Point provides a normal wireless service for the network, as opposed to the Virtual Access Point that is just used for provisioning the CPE Node 802. To connect to the Access Point, the processing logic can include a second processing thread that is separate from the first processing thread that handles communications with the Virtual Access Point. The second processing thread may include various functions, including Product CPE 822, Access Point (AP) 824, WPA Prod Cert 826, and radsecproxy Prod endpoint 828 for communicating via the Access Point.

As described above, as the network devices are deployed in a network, each node that automatically recognizes its role, automatically configures itself according to the role, and automatically provisions itself to the network. After being provisioned in the network, the node can provide authentication services via the Virtual Access Points, as described herein. An example of deploying multiple nodes in this manner is described below with respect to FIG. 9.

Figure 9:
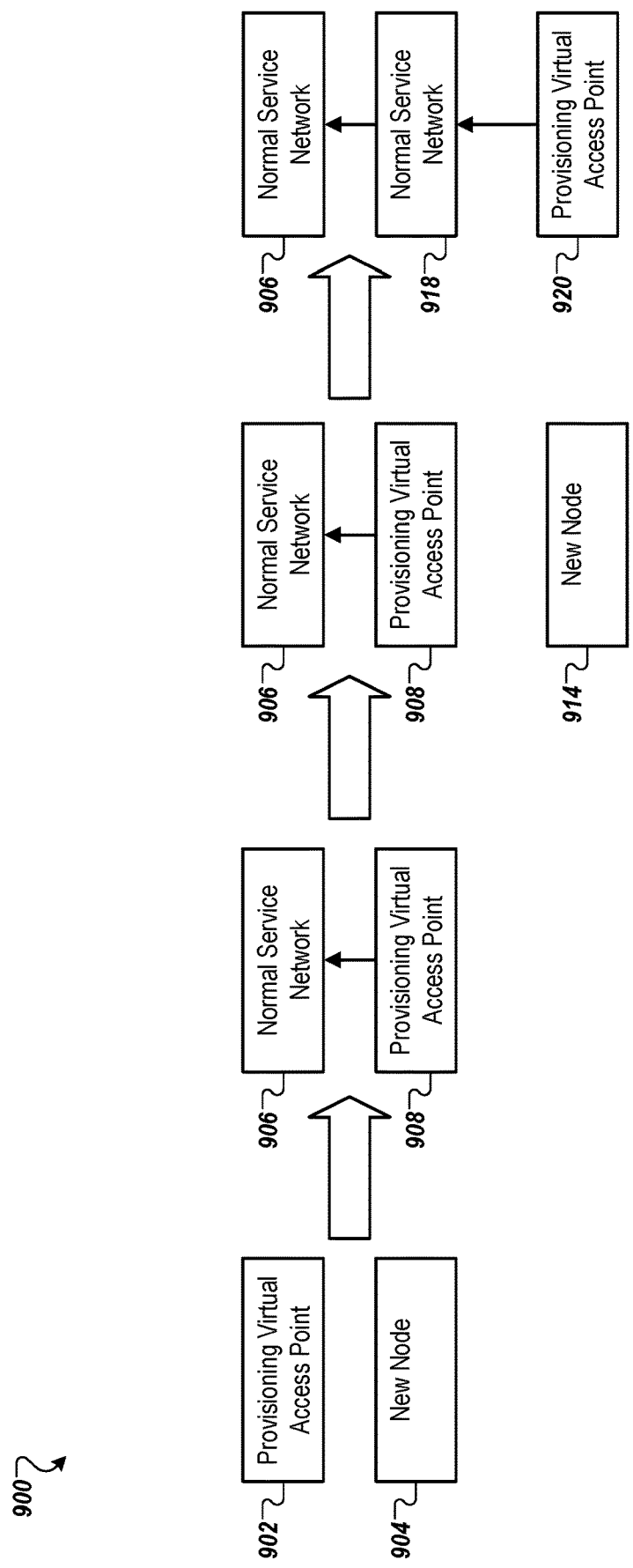
FIG. 9 is a functional diagram of a deployment process in which multiple nodes are provisioned and subsequently provide provisioning services to downstream nodes over time according to one embodiment.

FIG. 9 is a functional diagram of a deployment process 900 in which multiple nodes are provisioned and subsequently provide provisioning services to downstream nodes over time according to one embodiment. During the deployment process, a first node 902 provides a provisioning Virtual Access Point that allows a new node, a second node 902, to be provisioned to an existing network. Using the provisioning Virtual Access Point 902, the second node 904 can be provisioned and connected to a Normal Service network 906 provided by the first node 902. Once connected to the Normal Service network 906, the second node 904 can provide a provisioning Virtual Access Point 908 to downstream nodes. For example, a new node, third node 914, can use the provisioning Virtual Access Point 908, provided by the second node 904, to be provisioned to the network. Once provisioned to the network, the third node 914 can connect to the Normal Network Service 918, provided by the second node 904, and provide a provisioning Virtual Access Point 920 to downstream nodes.

Figure 10:
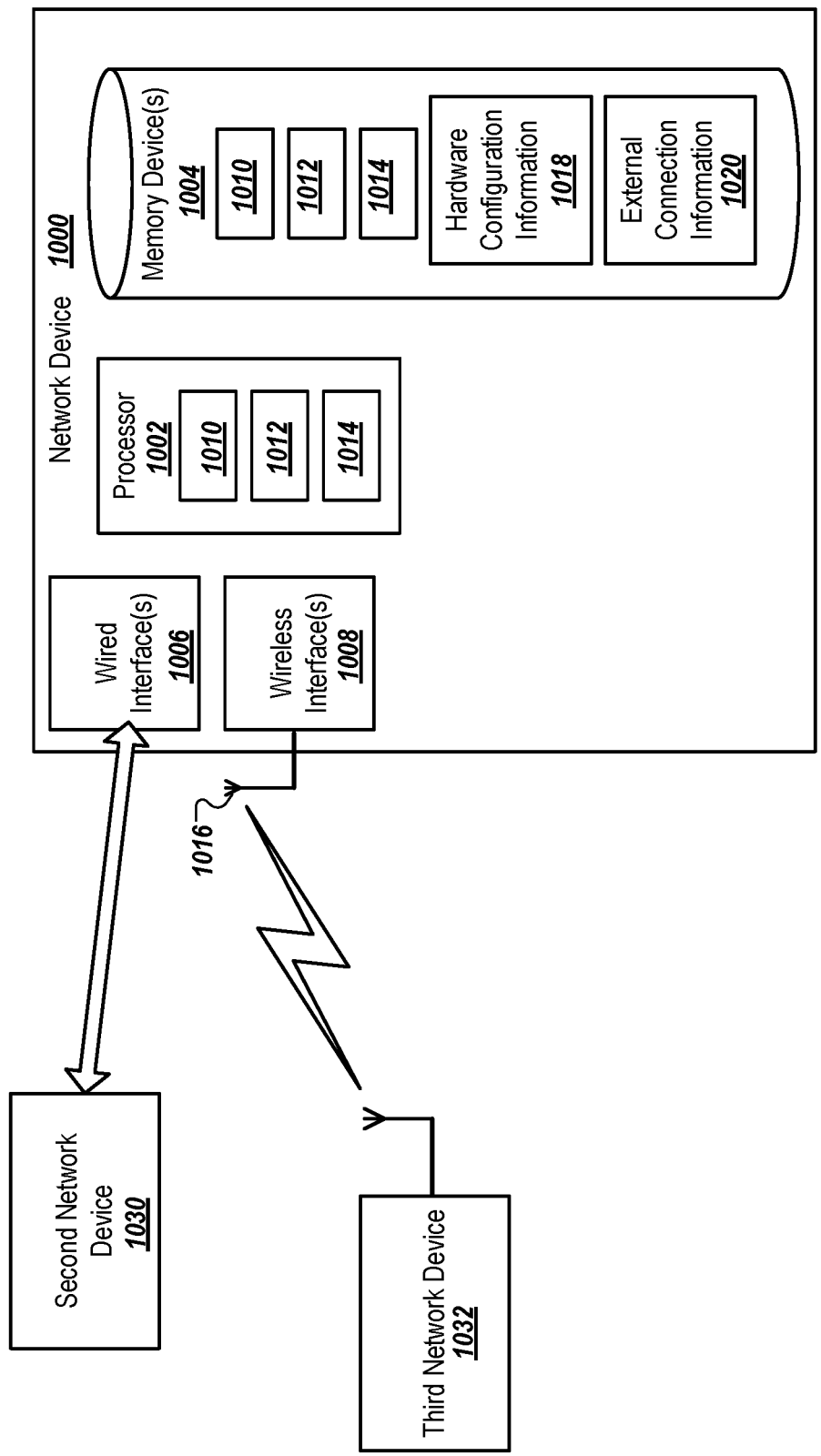
FIG. 10 is a block diagram of a network device with a self-recognition engine, a self-configuration engine, and a self-provisioning engine according to one embodiment.

FIG. 10 is a block diagram of a network device 1000 with a self-recognition engine 1010, a self-configuration engine 1012, and a self-provisioning engine 1014 according to one embodiment. In FIG. 10, the network device 1000 includes one or more processors 1002 (hereinafter referred to as "processor"), one or more memory devices 1004 (hereinafter referred to as "memory device"), one or more wired interfaces 1006, and one or more wireless interfaces 1008. For the one or more wired interfaces 1006, the network device 1000 can include one or more hardware ports (not illustrated in FIG. 10). For the one or more wireless interfaces 1008, the network device 1000 can include one or more radios (not illustrated in FIG. 10) and one or more antennas 1016.

The processor 1002 can be various type of processing devices, such as one or more Central Processing Units (CPUs), microcontrollers, field programmable gate arrays, or other types of processors or processing devices. The processor 1002 can implement the self-recognition engine 1010, the self-configuration engine 1012, and the self-provisioning engine 1014 using processing logic that comprises hardware (e.g., circuitry, dedicated logic, programmable logic, microcode, etc.), software, firmware, or a combination thereof, for deploying the network device 1000 to a network without manual intervention and manual configuration as described herein. The memory device 1004 can be any type of memory or storage device and can store instructions that implement the self-recognition engine 1010, the self-configuration engine 1012, and the self-provisioning engine 1014. The processor 1002 can communicate with other devices over the wired interfaces 1006 and wireless interfaces 1008. The wireless interfaces 1008 can implement one or more types of radio technologies, such as, for example, Wireless Local Area Network (WLAN) technologies, Wireless Personal Area Network (WPAN) technologies, cellular technologies, Long Range (LoRa) technologies, Body Area Network (BAN) technologies, Near-Me (NAN) technologies, or the like.

In one embodiment, the one or more memory devices store hardware configuration information 1018 and external connection information 1020. The hardware configuration information 1018 can include information about the hardware available at the network device 1000, including hardware that is plugged into the hardware ports of the network device 1000. For example, the hardware configuration information 1018 can be determined during a boot-up process, such as by the Basic Input/output System (BIOS). The hardware configuration information 1018 can be stored in memory, registers, a specified file, or the like. The hardware configuration information 1018 includes an indication of whether a storage device is attached to a hardware port of the network device 1000. The hardware configuration information 1018 can be used to allow the network device 1000 to self-recognize as a Storage Node, as described herein. The hardware configuration information 1018 can be used to help distinguish between roles in other manners, as well. The external connection information 1020 can include information about the connections of the network device 1000. For example, the external connection information 1020 can list each of the external connections to other devices, such as over wired interfaces or wireless interfaces. In one embodiment, the external connection information 1020 includes an IP address for a WAN port. In other embodiments, the external connection information 1020 includes IP addresses of a private subnet. As described herein, the external connection information 1020 can be used by the network device 1000 to self-recognize a role for the network device 1000. For example, if the external connection information 1020 indicates that the node's private subnet is 10.x.x.x and the IP address assigned to the WAN port is 204.x.x.x, the network device 1000 will recognize itself as a Router node.

During operation and after a power-up event, the processor 1002 automatically recognizes a role of the network device using the hardware configuration information 1018 and the external connection information 1020 without any manual intervention or manual configuration. The operations to perform the role self-recognition process can be done by the self-recognition engine 1010. Alternatively, the role can be automatically recognized by a role self-recognition process, such as those described above with respect to FIGS. 3-6. The processor 1002 can automatically configure the network device 1002 according to the role without any manual intervention or manual configuration. The operations to perform the self-configuration process can be done by the self-recognition engine 1010. Alternatively, the network device 1000 can be automatically configured by a role self-configuration process, such as those described above with respect to FIGS. 4-6. The processor 1002 can automatically provisions the network device 1000 to a network without any manual intervention or manual configuration. The operations to perform the self-provisioning process can be done by the self-provisioning engine 1014. Alternatively, the network device 1000 can be automatically provisioned by a role self-provisioning process, such as those described above with respect to FIGS. 6-9.

In some instances, the self-recognition engine 1010 determines, from the external connection information 1020, that the role of the network device is a Router Node responsive to a determination that an IP address, assigned to a WAN port, is not part of a same subnet as a private subnet. In other instances, the self-recognition engine 1010 determines, from the hardware configuration information 1018, that the role of the network device 1000 is a Storage Node responsive to a determination that a storage device is attached to a hardware port of the network device 1000. In other instances, the self-recognition engine 1010 determines, from the external connection information 1020, that the role of the network device 1000 is a Base Station Node responsive to a determination that i) the IP address is the same subnet as the private subnet part and ii) a RTT value to a Router Node is within a first specified criteria. In other instances, the self-recognition engine 1010 determines, from the external connection information 1020, that the role of the network device 1000 is a Relay Node responsive to a determination that iii) there is no IP address assigned to the WAN port and iv) a presence of a first Provisioning Virtual Access Point that operates on a first frequency band (e.g., UNII-3 band) is detected. In other instances, the self-recognition engine 1010 determines, from the external connection information 1020, that the role of the network device 1000 is a Gateway Node responsive to a determination that v) the IP address is part of the same subnet as the private subnet and vi) the RTT value to the Router Node is within a second specified criteria that is different than the first specified criteria. In other instances, the self-recognition engine 1010 determines, from the external connection information 1020, that the role of the network device is a CPE Node responsive to a determination that vii) there is no IP address assigned to the WAN port and viii) a presence of a second Provisioning Virtual Access Point that operates on a second frequency band (e.g., UNII-1 band) is detected.

In some instances, the self-configuration engine 1012, responsive to determining that the role of the network device 1000 is the Router Node, automatically configures the network device 1000 to provide a first NAT service for the network and assign a private IP address to a child node within a private IP address space of the Router Node. In other instances, the self-configuration engine 1012, responsive to determining that the role of the network device 1000 is the Storage Node, automatically configuring the network device 1000 to provide network storage and local caching for the network through a first wired interface (e.g., Ethernet interface). In other instances, the self-configuration engine 1012, responsive to determining that the role of the network device 1000 is the Base Station Node, automatically configures the network device 1000 to bridge a second wired interface with a first wireless interface and provides a first wireless service downstream for Relay Nodes on the first frequency band. The self-configuration engine 1012 can start the first Provisioning Virtual Access Point. For example, once the node recognizes itself as a Base Station Node, the node can start the first Provisioning Virtual Access Point that operates on the UNII-3 5 GHz band and can bridge its Ethernet interface with its wireless interface and can provide a wireless service downstream for Relay Nodes on the UNII-3 band. In other instances, the self-configuration engine 1012, responsive to determining that the role of the network device 1000 is the Relay Node, automatically configuring the network device 1000 to associate with a third wireless interface of a Base Station Node as a client and bridge the third wireless interface (e.g., client interface) with a second wired interface to service Gateway Nodes downstream from the Relay Node. For example, the self-configuration engine 1012 can associate with the Base Station's wireless interface as a client and bridges its client interface with its Ethernet interface to service downstream Gateway Nodes. In other instances, the self-configuration engine 1012, responsive to determining that the role of the network device 1000 is the Gateway Node, automatically configures the network device 1000 to bridge a third wired interface with a fourth wireless interface and provides a second wireless service downstream for CPE Nodes on the second frequency band. The self-configuration engine 1012 can start the second Provisioning Virtual Access Point. For example, the self-configuration engine 1012 can bridge its Ethernet interface with its wireless interface and provides wireless service downstream for Customer Premises Nodes on UNII-1 band. In other instances, the self-configuration engine 1012, responsive to determining that the role of the network device 1000 is the CPE Node, automatically configures the network device 1000 to associate with a fifth wireless interface of a Gateway Node as a client, provides a second NAT service for the network, and provides a third wireless service downstream for client devices on a third frequency band (e.g., 2.4 GHz band) that is different than the first frequency band and the second frequency band. For example, the self-configuration engine 1012 can associate with the Gateway's wireless interface as a client and provides NAT service to its downstream clients through its additional wireless radios.

In some instances, the self-provisioning engine 1014 detects either the first Provisioning Virtual Access Point or the second Provisioning Virtual Access Point. The self-provisioning engine 1014 connects to either the first Provisioning Virtual Access Point using first credentials or the second Provisioning Virtual Access point using the first credentials (e.g., manufacturer credentials). The Base Station or the Gateway Node relays the new node's certificate to the cloud to verify the device manufacturing record. The self-provisioning engine 1014 receives a remote command to generate second credentials. The self-provisioning engine 1014 disassociates from either the first Provisioning Virtual Access Point or the second Provisioning Virtual Access point and connects to a first Access Point of the Base Station Node using the second credentials or a second Access Point of the Gateway Node using the second credentials.

In some instances, the self-provisioning engine 1014 performs a self-provisioning flow with two phases: device manufacturing identity verification, and device authentication. For example, upon powering up, the new node first scans for the Provision Virtual Access Point that is being broadcasted by either the Base Station Node or the Gateway Node. Once the Access Point is detected, the new node automatically connects to the Access Point and using its own certificates. The Base Station or Gateway Node relays the new node's certificate to the cloud to verify the device manufacturing record. Once the device manufacturing record is verified, the cloud sends remote command to command the new node to generate a new certificate that is used to connect to the normal service network. The new node then disassociates from the Provision Virtual Access Point and connects to the normal service network.

Figure 11:
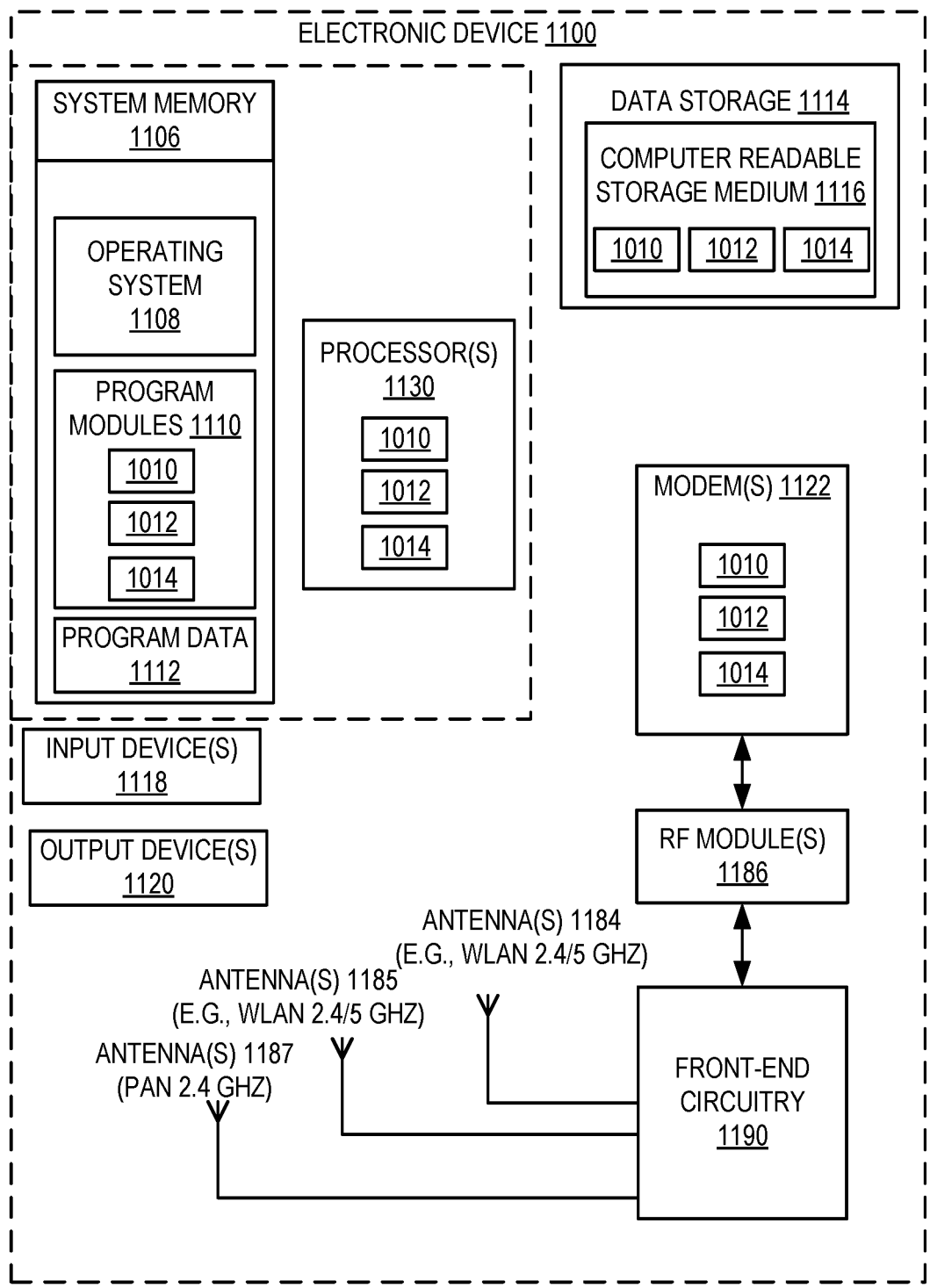
FIG. 11 is a block diagram of an electronic device with a self-recognition engine, a self-configuration engine, and a self-provisioning engine according to one embodiment.

FIG. 11 is a block diagram of an electronic device 1100 with a self-recognition engine, a self-configuration engine, and a self-provisioning engine according to one embodiment. The electronic device 1100 may correspond to the electronic devices described above with respect to FIGS. 1-10. Alternatively, the electronic device 1100 may be other electronic devices, as described herein.

The electronic device 1100 includes one or more processor(s) 1130, such as one or more CPUs, microcontrollers, field programmable gate arrays, or other types of processors. The electronic device 1100 also includes system memory 1106, which may correspond to any combination of volatile and/or non-volatile storage mechanisms. The system memory 1106 stores information that provides operating system component 1108, various program modules 1110, program data 1112, and/or other components. In one embodiment, the system memory 1106 stores instructions of methods to control operation of the electronic device 1100. The electronic device 1100 performs functions by using the processor(s) 1130 to execute instructions provided by the system memory 1106. In one embodiment, the program modules 1110 may include the self-recognition engine 1010, a self-configuration engine 1012, and a self-provisioning engine 1014. The self-recognition engine 1010 may perform some or all of the operations of the role self-recognition processes descried herein, such as method 300. The self-configuration engine 1012 may perform some or all of the operations of the self-configuration processes descried herein, such as method 400 or method 500. The self-provisioning engine 1014 may perform some or all of the operations of the self-provisioning processes descried herein, such as method 600, method 700, method 800, or process 900.

The electronic device 1100 also includes a data storage device 1114 that may be composed of one or more types of removable storage and/or one or more types of non-removable storage. The data storage device 1114 includes a computer-readable storage medium 1116 on which is stored one or more sets of instructions embodying any of the methodologies or functions described herein. Instructions for the program modules 1110 (e.g., the self-recognition engine 1010, a self-configuration engine 1012, and a self-provisioning engine 1014) may reside, completely or at least partially, within the computer-readable storage medium 1116, system memory 1106 and/or within the processor(s) 1130 during execution thereof by the electronic device 1100, the system memory 1106 and the processor(s) 1130 also constituting computer-readable media. The electronic device 1100 may also include one or more input devices 1118 (keyboard, mouse device, specialized selection keys, etc.) and one or more output devices 1120 (displays, printers, audio output mechanisms, etc.).

The electronic device 1100 further includes a modem 1122 to allow the electronic device 1100 to communicate via a wireless connections (e.g., such as provided by the wireless communication system) with other computing devices, such as remote computers, an item providing system, and so forth. The modem 1122 can be connected to one or more radio frequency (RF) modules 1186. The RF modules 1186 may be a WLAN module, a WAN module, WPAN module, Global Positioning System (GPS) module, or the like. The antenna structures (antenna(s) 1184, 1185, 1187) are coupled to the front-end circuitry 1190, which is coupled to the modem 1022. The front-end circuitry 1190 may include radio front-end circuitry, antenna switching circuitry, impedance matching circuitry, or the like. The antennas 1184 may be GPS antennas, Near-Field Communication (NFC) antennas, other WAN antennas, WLAN or PAN antennas, or the like. The modem 1122 allows the electronic device 1110 to handle both voice and non-voice communications (such as communications for text messages, multimedia messages, media downloads, web browsing, etc.) with a wireless communication system. The modem 1122 may provide network connectivity using any type of mobile network technology including, for example, Cellular Digital Packet Data (CDPD), General Packet Radio Service (GPRS), EDGE, Universal Mobile Telecommunications System (UMTS), Single-Carrier Radio Transmission Technology (1xRTT), Evaluation Data Optimized (EVDO), High-Speed Down-Link Packet Access (HSDPA), Wi-Fi®, Long Term Evolution (LTE) and LTE Advanced (sometimes generally referred to as 4G), etc.

The modem 1122 may generate signals and send these signals to antenna(s) 1184 of a first type (e.g., WLAN 5 GHz), antenna(s) 1185 of a second type (e.g., WLAN 2.4 GHz), and/or antenna(s) 1187 of a third type (e.g., WAN), via front-end circuitry 1190, and RF module(s) 1186 as descried herein. Antennas 1184, 1185, 1187 may be configured to transmit in different frequency bands and/or using different wireless communication protocols. The antennas 1184, 1185, 1187 may be directional, omnidirectional, or non-directional antennas. In addition to sending data, antennas 1184, 1185, 1187 may also receive data, which is sent to appropriate RF modules connected to the antennas. One of the antennas 1184, 1185, 1187 may be any combination of the antenna structures described herein.

In one embodiment, the electronic device 1110 establishes a first connection using a first wireless communication protocol, and a second connection using a different wireless communication protocol. The first wireless connection and second wireless connection may be active concurrently, for example, if an electronic device is receiving a media item from another electronic device via the first connection) and transferring a file to another electronic device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna.

Though a modem 1122 is shown to control transmission and reception via antenna (1184, 1185, 1187), the electronic device 1110 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, Read-Only Memories (ROMs), compact disc ROMs (CD-ROMs) and magnetic-optical disks, Random Access Memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A network device comprising:
   a memory device that includes hardware configuration information that indicates whether a storage device is attached to a hardware port and external connection information that indicates an Internet Protocol (IP) address assigned to a wide area network (WAN) port, if any; and
   a processing device coupled to the memory device, wherein the processing device, after a power-up event, automatically recognizes a role of the network device using only the hardware configuration information and the external connection information stored in the memory device, automatically configures the network device according to the role without any manual intervention, and automatically provisions the network device to a network without any manual intervention, wherein:
   the role of the network device is a Router Node when the IP address, specified in the external connection information, is not part of a private subnet;
   the role of the network device is a Storage Node when the storage device is attached to the hardware port of the processing device as specified in the hardware configuration information;
   the role of the network device is a Base Station Node when i) the IP address, specified in the external connection information, is part of the private subnet and ii) a Round Trip Time (RTT) value to the Router Node, specified in the external connection information, is within a first specified criterion;
   the role of the network device is a Relay Node when iii) the external connection information indicates that there is no IP address assigned to the WAN port and iv) a presence of a first Provisioning Virtual Access Point that operates on a first frequency band is detected;

the role of the network device is a Gateway Node when v) when the IP address, specified in the external connection information, is part of the private subnet and vi) the RTT value to the Router Node, specified in the external connection information, is within a second specified criterion that is different than the first specified criterion; and the role of the network device is a Customer Premises Equipment (CPE) Node when vii) the external connection information indicates that there is no IP address assigned to the WAN port and viii) a presence of a second Provisioning Virtual Access Point that operates on a second frequency band is detected, wherein the second frequency band is different than the first frequency band.

2. The network device of claim 1, wherein the processing device automatically configures the network device according to the role by performing one of:

responsive to determining that the role of the network device is the Router Node, automatically configuring the network device to provide a first Network Address Translation (NAT) service for the network and assign a private IP address to a child node within a private IP address space of the Router Node;

responsive to determining that the role of the network device is the Storage Node, automatically configuring the network device to provide network storage and local caching for the network through a first wired interface;

responsive to determining that the role of the network device is the Base Station Node, automatically configuring the network device to bridge a second wired interface with a first wireless interface and provide a first wireless service downstream for Relay Nodes on the first frequency band, and starting the first Provisioning Virtual Access Point;

responsive to determining that the role of the network device is the Relay Node, automatically configuring the network device to associate with a third wireless interface of the Base Station Node as a client and bridge the third wireless interface with the second wired interface to service Gateway Nodes downstream from the Relay Node;

responsive to determining that the role of the network device is the Gateway Node, automatically configuring the network device to bridge a third wired interface with a fourth wireless interface and provide a second wireless service downstream for CPE Nodes on the second frequency band, and starting the second Provisioning Virtual Access Point; or responsive to determining that the role of the network device is the CPE Node, automatically configuring the network device to associate with a fifth wireless interface of a Gateway Node as a client, provide a second NAT service for the network, and provide a third wireless service downstream for client devices on a third frequency band that is different than the first frequency band and the second frequency band.

3. A method comprising:

storing hardware configuration information and external connection information in a memory device of a network device, wherein the external connection information indicates an Internet Protocol (IP) address that is assigned to the network device or no IP address is assigned to the network device, and wherein the hardware configuration information indicates whether a storage device is attached to the network device;

determining, by a processing device of the network device, a role of the network device using only the hardware configuration information and the external connection information stored in the memory device without any manual intervention or manual configuration, wherein the role of the network device is at least one of a Router Node, a Storage Node, a Base Station Node, a Relay Node, a Gateway Node, or a Customer Premises Equipment (CPE) Node, wherein the determining the role further comprises distinguishing between the Router Node, the Base Station Node, the Relay Node, the Gateway Node, or the CPE node using at least the IP address that is assigned to the network device or no IP address being assigned to the network device;

configuring the network device according to the role without any manual intervention or manual configuration; and provisioning the network device to a network without any manual intervention or manual configuration.

4. The method of claim 3, wherein the determining the role comprises performing one of:

determining, from the external connection information, that the role of the network device is the Router Node responsive to a determination that an Internet Protocol (IP) address assigned to a wide area network (WAN) port of the network device is not part of a private subnet of an IP address space of the network device;

determining, from the hardware configuration information, that the role of the network device is the Storage Node responsive to a determination that the storage device is attached to a hardware port of the processing device;

determining, from the external connection information, that the role of the network device is the Base Station Node responsive to a determination that i) the IP address is part of the private subnet and ii) a Round Trip Time (RTT) value to the Router Node of the network is within a first specified criterion that distinguishes the Base Station Node from the Gateway Node;

determining, from the external connection information, that the role of the network device is a Relay Node responsive to a determination that iii) there is no IP address assigned to the WAN port and iv) a presence of a first Provisioning Virtual Access Point that operates on a first frequency band is detected;

determining, from the external connection information, that the role of the network device is a Gateway Node responsive to a determination that v) the IP address is part of the private subnet and vi) the RTT value to the Router Node is within a second specified criterion that distinguishes the Gateway Node from the Base Station Node, wherein the second specified criterion is different than the first specified criterion; or determining, from the external connection information, that the role of the network device is a Customer Premises Equipment (CPE) node responsive to a determination that vii) there is no IP address assigned to the WAN port and viii) a presence of a second Provisioning Virtual Access Point that operates on a second frequency band is detected, wherein the second frequency band is different than the first frequency band.

5. The method of claim 3, wherein the automatically configuring the network device comprises performing one of:
responsive to determining that the role of the network device is the Router Node, providing a first Network Address Translation (NAT) service for the network and assign a private IP address to a child node of the Router Node, the private IP address being within a private IP address space of the Router Node;
responsive to determining that the role of the network device is the Storage Node, configuring the network device to provide network storage and local caching for the network through a first wired interface;
responsive to determining that the role of the network device is the Base Station Node,
configuring the network device to bridge a second wired interface with a first wireless interface and provide a first wireless service downstream for Relay Nodes on a first frequency band, and
starting a first Provisioning Virtual Access Point;
responsive to determining that the role of the network device is the Relay Node, configuring the network device to associate with a third wireless interface of the Base Station Node as a first client of the Relay Node and bridge the third wireless interface with the second wired interface to service Gateway Nodes downstream from the Relay Node;
responsive to determining that the role of the network device is the Gateway Node,
configuring the network device to bridge a third wired interface with a fourth wireless interface and provide a second wireless service downstream for CPE Nodes on a second frequency band, and
starting a second Provisioning Virtual Access Point; or
responsive to determining that the role of the network device is the CPE Node, configuring the network device to associate with a fifth wireless interface of a Gateway Node as a client of the Gateway Node, provide a second NAT service for the network, and provide a third wireless service downstream for client devices on a third frequency band that is different than the first frequency band and the second frequency band.

6. The method of claim 3, wherein the configuring the network device further comprises performing one of:
responsive to determining that the role of the network device is the Router Node, creating a first Network Address Translation (NAT) table, wherein the first NAT table comprises an entry that maps the IP address to a first private IP address for a child node;
responsive to determining that the role of the network device is the Storage Node, initiating a content service daemon to monitor for requests for content data;
responsive to determining that the role of the network device is the Base Station Node, creating a first bridge that connects a second wired interface between the Base Station Node and the Router Node to a first wireless interface and assigning a first Provisioning Access Point to the first bridge;
responsive to determining that the role of the network device is the Relay Node, creating a second bridge that connects a third wireless interface to the second wired interface between the Relay Node and the Base Station Node and connecting the Relay Node to the Base Station Node as a client of the Base Station Node;
responsive to determining that the role of the network device is the Gateway Node, creating a third bridge that connects the third wired interface to a fourth wireless interface and assigning a second Provisioning Virtual Access Point to the third bridge; or
responsive to determining that the role of the network device is the CPE Node, creating a second NAT table and connecting the CPE Node to the Gateway Node as a client of the Gateway Node.

7. The method of claim 3, wherein the configuring the network device comprises performing one of:
responsive to determining that the role of the network device is the Base Station Node,
creating a first wireless distribution system (WDS) between a second wired interface and a first wireless interface, and
starting a first Provisioning Virtual Access Point, wherein the first Provisioning Virtual Access Point is configured to provide a first wireless service on a first frequency band, or
responsive to determining that the role of the network device is the Gateway Node,
creating a second WDS between a third wired interface and a fourth wireless interface, and
starting a second Provisioning Virtual Access point, wherein the second Provisioning Virtual Access Point is configured to provide a second wireless service on a second frequency band.

8. The method of claim 3, wherein the provisioning of the network device comprises:
detecting one of a first Provisioning Virtual Access Point that operates on a first frequency band or a second Provisioning Virtual Access Point that operates on a second frequency band;
connecting to one of the first Provisioning Virtual Access Point or the second Provisioning Virtual Access point using first credentials;
receiving a command, from an authentication service at a remote server, to generate second credentials;
disassociating from the at least one of the first Provisioning Virtual Access Point or the second Provisioning Virtual Access point; and
connecting to one of a first Access Point of the Base Station Node using the second credentials or a second Access Point of the Gateway Node using the second credentials.

9. The method of claim 8, wherein the first frequency band is the UNII-3 band and the second frequency band is the UNII-1 band.

10. The method of claim 3, further comprising:
powering up the network device;
starting a first process to determine the role of the network device without any manual intervention or manual configuration;
after starting the first process, determining that no role is detected;
responsive to determining that no role is detected, searching for and detecting a first Provisioning Virtual Access Point;
associating with the first Provisioning Virtual Access Point;
sending first credentials to an authentication service at a remote server via the first Provisioning Virtual Access Point;
receiving a response from the authentication service that the first credentials are verified;
generating second credentials;
sending the second credentials to the authentication service; and connecting to an access point using the second credentials.

11. The method of claim 10, further comprising:
starting a second Provisioning Virtual Access Point;
receiving a request to associate a second network device with the second Provisioning Virtual Access Point;
receiving third credentials from the second network device;
forwarding the third credentials to the authentication service at the remote server;
receiving a response from the authentication service that the third credentials are verified; and
sending the response to the second network device.

12. The method of claim 3, wherein the determining the role comprises:
determining, from the external connection information, that an Internet Protocol (IP) address, which is assigned to a wide area network (WAN) port, is part of a private subnet; and
responsive to determining that the IP address is part of the private subnet,
generating a Round Trip Time (RTT) timing report using Internet Control Message Protocol (ICMP) messages with the Router Node; and
determining a RTT value between the network device and the Router Node using the RTT timing report; and one of:
determining, from the external connection information, that the role of the network device is the Base Station Node responsive to a determination that the RTT value is less than a specified value, wherein the RTT value being less than the specified value corresponds to a first amount of time that includes processing latency at the Router Node, processing latency of any intermediate network switch, and processing latency of the network device itself; or
determining, from the external connection information, that the role of the network device is the Gateway Node responsive to a determination that the RTT value is greater than the specified value, wherein the RTT value being greater than the specified value corresponds to a second amount of time that includes at least a latency caused transmission over a third wireless interface, wherein the second amount of time is greater than the first amount of time.

13. A system comprising:
a first network device, wherein the first network device has a role of a Router Node in a network;
a network switch coupled to the first network device over a first wired interface; and
a second network device coupled to the network switch over a second wired interface, wherein the second network device does not initially have a role at a power-up event, wherein the second network device is assigned a first Internet Protocol (IP) address by the Router Node, wherein the second network device is to:
generate a Round Trip Time (RTT) timing report using Internet Control Message Protocol (ICMP) messages with the Router Node;
determine a RTT value between the second network device and the Router Node using the RTT timing report;
determine that the RTT value is less than a first threshold;
determine that the first IP address is part of a private subnet of an IP address space of the second network device;
configure the second network device to have a role of a Base Station Node;
send first credentials to an authentication service at a remote server via the Router Node;
receive a response from the authentication service that the first credentials are verified;
generate second credentials;
send the second credentials to the authentication service via the Router Node; and
connecting to the Router Node using the second credentials.

14. The system of claim 13, further comprising:
a third network device, wherein the third network device does not initially have a role at the power-up event, wherein the third network device is not assigned a second IP address by the Router Node, wherein the third network device is to:
detect a presence of a first Provisioning Virtual Access Point that operates on a first frequency band, wherein the first Provisioning Virtual Access Point is provided by the Base Station Node;
configure the third network device to have a role of a Relay Node;
send third credentials to the authentication service via the first Provisioning Virtual Access Point;
receive a response from the authentication service that the third credentials are verified;
generate fourth credentials;
send the fourth credentials to the authentication service via the first Provisioning Virtual Access Point; and
connecting to a first Access Point, provided by the Base Station Node, using the fourth credentials.

15. The system of claim 13, further comprising:
a fourth network device coupled to a third network device over a third wired interface, wherein the third network device has a role of a Relay Node, wherein the fourth network device does not initially have a role at the power-up event, wherein the fourth network device is assigned a third IP address by the Router Node, wherein the fourth network device is to:
generate a second RTT timing report using the ICMP messages with the Router Node;
determine a second RTT value between the fourth network device and the Router Node using the second RTT timing report;
determine that the second RTT value is greater than the first threshold;
determine that the third IP address is part of the private subnet;
configure the fourth network device to have a role of a Gateway Node;
send third credentials to the authentication service via the Relay Node;
receive a response from the authentication service that the third credentials are verified;
generate fourth credentials;
send the fourth credentials to the authentication service via the Relay Node; and
connecting to the Relay Node using the fourth credentials.

16. The system of claim 15, further comprising:
a fifth network device coupled to the third network device over a fourth wired interface, wherein the fifth network device does not have a role at the power-up event, wherein the fifth network device is assigned a fourth IP address by the Router Node, wherein the fifth network device is to:

generate a third RTT timing report using the ICMP messages with the Router Node;
determine a third RTT value between the fifth network device and the Router Node using the third RTT timing report;
determine that the third RTT value is greater than the first threshold;
determine that the fourth IP address is part of the private subnet;
configure the fifth network device to have a role of a Gateway Node;
send fifth credentials to the authentication service via the Relay Node;
receive a response from the authentication service that the fifth credentials are verified;
generate sixth credentials;
send the sixth credentials to the authentication service via the Relay Node; and
connecting to the Relay Node using the six credentials.

17. The system of claim 16, wherein the fifth network device is further to:
create a wireless distribution system (WDS) between a fourth wired interface and a fourth wireless interface, and
start a second Provisioning Virtual Access point that operates on a second frequency band.

18. The system of claim 13, further comprising:
a sixth network device, wherein the sixth network device does not initially have a role at the power-up event, wherein the sixth network device is not assigned an IP address by the Router Node, wherein the sixth network device is to:
detect a presence of a second Provisioning Virtual Access Point that operates on a second frequency band, wherein the second Provisioning Virtual Access Point is provided by a fourth network device that has a role of a Gateway Node;
configure the sixth network device to have a role of a Customer Premises Equipment (CPE) Node;
send third credentials to the authentication service via the second Provisioning Virtual Access Point;
receive a response from the authentication service that the third credentials are verified;
generate fourth credentials;
send the fourth credentials to the authentication service via the second Provisioning Virtual Access Point; and
connecting to a second Access Point, provided by the Gateway Node, using the fourth credentials.

19. The system of claim 13, further comprising:
a seventh network device coupled to the network switch over a fifth wired interface, wherein the seventh network device does not initially have a role at the power-up event, wherein the seventh network device is assigned a fourth IP address by the Router Node, wherein the seventh network device is to:
determine that a storage device is attached to a hardware port of the seventh network device;
configure the seventh network device to have a role of a Storage Node;
send third credentials to the authentication service via the Router Node;
receive a response from the authentication service that the third credentials are verified;
generate fourth credentials;
send the fourth credentials to the authentication service via the Router Node; and
connecting to the Router Node using the fourth credentials.

20. The system of claim 13, further comprising:
a third network device, wherein the third network device does not initially have a role at the power-up event, wherein the third network device is not assigned a second IP address by the Router Node, wherein the third network device is to:
determine that a storage device is attached to a hardware port of the third network device;
detect a presence of a first Provisioning Virtual Access Point that operates on a first frequency band, wherein the first Provisioning Virtual Access Point is provided by the Base Station Node;
configure the third network device to have a role of a hybrid Relay and Storage Node;
send third credentials to the authentication service via the first Provisioning Virtual Access Point;
receive a response from the authentication service that the third credentials are verified;
generate fourth credentials;
send the fourth credentials to the authentication service via the first Provisioning Virtual Access Point; and
connecting to a first Access Point, provided by the Base Station Node, using the fourth credentials.

\* \* \* \* \*